US011965315B2

(12) United States Patent
Kumagai et al.

(10) Patent No.: US 11,965,315 B2
(45) Date of Patent: Apr. 23, 2024

(54) WORK MACHINE

(71) Applicant: Hitachi Construction Machinery Co., Ltd., Tokyo (JP)

(72) Inventors: Kento Kumagai, Ami-Machi (JP); Shinya Imura, Toride (JP); Yasutaka Tsuruga, Ryugasaki (JP); Takaaki Chiba, Tsuchiura (JP); Hiroaki Amano, Tsukuba (JP); Shinji Nishikawa, Kasumigaura (JP); Akihiro Narazaki, Tsukuba (JP); Genroku Sugiyama, Ryugasaki (JP); Shinjiro Yamamoto, Ami-Machi (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/025,707

(22) PCT Filed: Dec. 8, 2021

(86) PCT No.: PCT/JP2021/045193
§ 371 (c)(1),
(2) Date: Mar. 10, 2023

(87) PCT Pub. No.: WO2022/190491
PCT Pub. Date: Sep. 15, 2022

(65) Prior Publication Data

US 2023/0358022 A1 Nov. 9, 2023

(30) Foreign Application Priority Data

Mar. 9, 2021 (JP) ................................ 2021-036844

(51) Int. Cl.
*E02F 9/22* (2006.01)
*F15B 11/042* (2006.01)
(Continued)

(52) U.S. Cl.
CPC .......... *E02F 9/2228* (2013.01); *E02F 9/2203* (2013.01); *F15B 11/0423* (2013.01);
(Continued)

(58) Field of Classification Search
CPC ... F15B 11/042; F15B 11/0423; F15B 11/055; F15B 11/165; F15B 11/17;
(Continued)

(56) References Cited

U.S. PATENT DOCUMENTS 5,941,155 A 8/1999 Arai et al.
7,594,395 B2 * 9/2009 Oka ..................... E02F 9/2235 60/486
(Continued)

FOREIGN PATENT DOCUMENTS

JP 11-30204 A 2/1999
JP 2001-323901 A 11/2001
(Continued)

OTHER PUBLICATIONS

International Search Report (PCT/ISA/210) issued in PCT Application No. PCT/JP2021/045193 dated Mar. 1, 2022 with English translation (five (5) pages).
Japanese-language Written Opinion (PCT/ISA/237) issued in PCT Application No. PCT/JP2021/045193 dated Mar. 1, 2022 (three (3) pages).
(Continued)

*Primary Examiner* — Michael Leslie
(74) *Attorney, Agent, or Firm* — Crowell & Moring LLP

(57) ABSTRACT

The invention of the present application intends to provide a work machine that can ensure high operability by preventing abrupt actuation of an actuator and a shock to a machine body by use of a bleed-off function at the time of starting of the actuator and that can improve the energy-saving performance by reducing a bleed-off flow rate after the starting of the actuator. For this purpose, a controller opens a bleed-off valve at a timing at which an operation device is being operated and before a flow rate of a hydraulic pump starts
(Continued)

increasing, and closes the bleed-off valve at a timing at which the operation device is being operated and after the flow rate of the hydraulic pump has started increasing.

5 Claims, 17 Drawing Sheets

(51) Int. Cl.
*F15B 11/16* (2006.01)
*F15B 11/17* (2006.01)

(52) U.S. Cl.
CPC ............ *F15B 11/165* (2013.01); *F15B 11/17* (2013.01); *E02F 9/2242* (2013.01); *F15B 2211/45* (2013.01); *F15B 2211/6346* (2013.01)

(58) Field of Classification Search
CPC ... F15B 2211/45; E02F 9/2203; E02F 9/2228; E02F 9/2232; E02F 9/2239; E02F 9/2242
See application file for complete search history.

(56) References Cited

U.S. PATENT DOCUMENTS

| | | | | |
|---|---|---|---|---|
| 9,879,405 | B2 * | 1/2018 | Saitoh .................. | E02F 9/2225 |
| 10,851,809 | B2 * | 12/2020 | Kondo .................. | F15B 11/165 |
| 11,692,332 | B2 * | 7/2023 | Nakajima ............ | F15B 11/165<br>60/421 |
| 2021/0332563 | A1 | 10/2021 | Kanazawa et al. | |

FOREIGN PATENT DOCUMENTS

| | | | |
|---|---|---|---|
| JP | 3403535 | B2 | 5/2003 |
| JP | 2020-133705 | A | 8/2020 |

OTHER PUBLICATIONS

International Preliminary Report on Patentability (PCT/IB/338 & PCT/IB/373) issued in PCT Application No. PCT/JP2021/045193 dated Sep. 21, 2023, including English translation of document C2 (Japanese-language Written Opinion (PCT/ISA/237), filed on Mar. 10, 2023) (5 pages).

* cited by examiner

WORK MACHINE

TECHNICAL FIELD

The present invention relates to a work machine such as a hydraulic excavator.

BACKGROUND ART

A work machine such as a hydraulic excavator includes a machine body including a swing structure and a work device (front device) attached to the swing structure. The work device includes a boom (front member) connected to the swing structure pivotably in the vertical direction, an arm (front member) connected to the tip of the boom pivotably in the vertical direction, a bucket (front member) connected to the tip of the arm pivotably in the vertical direction, a boom cylinder (actuator) that drives the boom, an arm cylinder (actuator) that drives the arm, and a bucket cylinder (actuator) that drives the bucket. In such a work machine, when the front members of the work device are operated by the respective manual operation levers, the machine body thereof is required to have favorable operability.

Thus, a hydraulic system of the general work machine employs a bleed-off function in order to alleviate abrupt actuation and a shock at the time of start of an operation of the actuator and to smoothen the operation. The bleed-off function refers to a function of discharging part of a hydraulic operating fluid which is to be supplied from a fluid pump to the actuator, to a tank via a bleed-off circuit.

However, when the bleed-off function is employed, a bleed-off flow rate to be discharged to the hydraulic operating fluid tank needs to be delivered from a hydraulic pump in addition to the flow rate necessary for driving of the actuator, leading to a lowering of the energy-saving performance of the hydraulic system.

Thus, for example, a technique as in Patent Document 1 has been proposed as a technique for improving the energy-saving performance while ensuring the operability by the bleed-off function. A controller of a construction machine described in Patent Document 1 includes a bleed-off control valve that makes an opening area small according to an increase in the operation amount of an actuator. According to such a configuration, when a fully-operated actuator and a finely-operated (half-operated) actuator are operated in a combined manner, the opening area is made small or zero in a bleed-off restrictor of a flow control valve relating to the fully-operated actuator whose operation amount becomes the maximum. With this, at the time when a fine operation and a full operation of actuators are performed in a combined manner, the bleed-off flow rate to be discharged to the tank can be reduced, and a flow rate equivalent to the flow rate by which the reduction can be made can be utilized to increase the flow rate to be supplied to the actuators. This makes it possible to improve the energy-saving performance and the work efficiency compared with the conventional technique.

PRIOR ART DOCUMENT

Patent Document

Patent Document 1: JP-3403535-B

SUMMARY OF THE INVENTION

Problems to be Solved by the Invention

When the controller of the construction machine described in Patent Document 1 is applied to a hydraulic system in which the flow rate necessary for driving of an actuator is supplied by flow rate control of a hydraulic pump, however, there is the following problems at the time of a fine operation or a half operation executed solely or in a combined manner.

In the half operation, the bleed-off flow rate is always generated, which makes the state in which a flow rate loss is unnecessarily caused even when it is possible to sufficiently control the actuator speed by control of the pump flow rate corresponding to the operation lever input amount.

Further, when switching from a sole operation to a combined operation is made in the half operation, the number of actuators in operation increases, and the flow rate that should be supplied by the pump also increases. At this time, the bleed-off opening has become smaller in the previous sole operation than that when no operation is executed. Therefore, there is a possibility that an impact of an increase in the pump flow rate accompanying the switching to the combined operation cannot sufficiently be absorbed, and a shock due to the sudden increase in the pump pressure may occur, resulting in the deterioration in the operability.

The present invention is made in view of such actual circumstances, and an object thereof is to provide a work machine that can ensure high operability by preventing abrupt actuation of an actuator and a shock to a machine body by use of a bleed-off function at the time of starting of the actuator and that can improve the energy-saving performance by reducing the bleed-off flow rate after the starting of the actuator.

Means for Solving the Problems

In order to achieve the above-described object, according to the present invention, there is provided a work machine including a machine body, a work device attached to the machine body, an actuator that drives the machine body or the work device, an operation device for giving an instruction on an operation of the actuator, a hydraulic pump of a variable displacement type, a pump regulator that controls a capacity of the hydraulic pump, a hydraulic operating fluid tank that supplies a hydraulic operating fluid to the hydraulic pump, a directional control valve that controls a flow of a hydraulic fluid to be supplied from the hydraulic pump to the actuator, a bleed-off valve disposed on a flow line that connects a pump line of the hydraulic pump to the hydraulic operating fluid tank, and a controller that controls the pump regulator, the directional control valve, and the bleed-off valve according to an input amount of the operation device. The controller is configured to open the bleed-off valve at a timing at which the operation device is being operated and before a flow rate of the hydraulic pump starts increasing, and close the bleed-off valve at a timing at which the operation device is being operated and after the flow rate of the hydraulic pump has started increasing.

According to the present invention configured as above, the bleed-off valve is opened at a timing at which the operation device is being operated and before the flow rate of the hydraulic pump starts increasing, and abrupt actuation of the actuator and a shock to the machine body are thus prevented at the time of starting of the actuator. This makes it possible to ensure high operability. Further, the bleed-off valve is closed at a timing at which the operation device is being operated and after the flow rate of the hydraulic pump has started increasing, and the bleed-off flow rate is thus reduced after starting of the actuator. This makes it possible to improve the energy-saving performance.

ADVANTAGES OF THE INVENTION

With the work machine according to the present invention, high operability can be ensured by preventing abrupt actuation of the actuator and a shock to the machine body by use of the bleed-off function at the time of starting of the actuator, and the energy-saving performance can be improved by reducing the bleed-off flow rate after the starting of the actuator.

According to the present invention configured as above, the bleed-off function is enabled at the time of starting of the actuator, and abrupt actuation of the actuator and a shock to the machine body can be prevented. Moreover, when it is possible to sufficiently control the actuator speed by control of the pump flow rate corresponding to the operation lever input amount, the energy-saving performance can be improved by eliminating the bleed-off flow rate.

MODES FOR CARRYING OUT THE INVENTION

Figure 1:
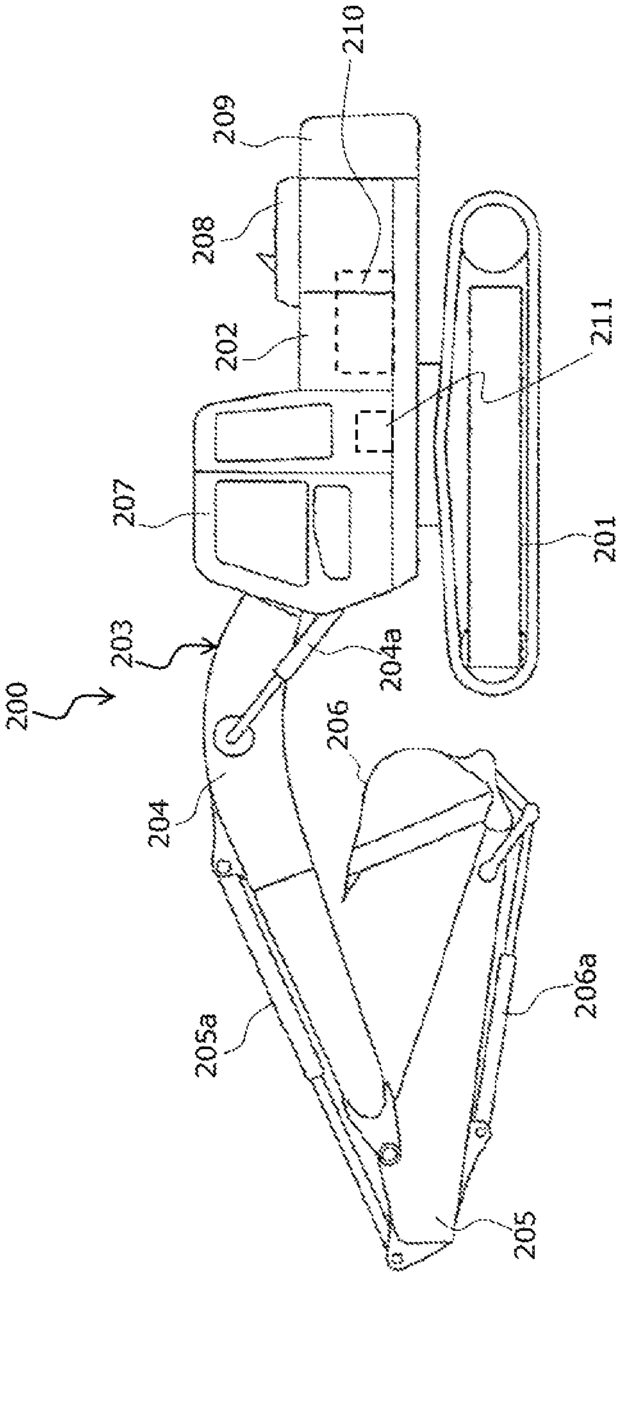
FIG. 1 is a side view of a hydraulic excavator according to an embodiment of the present invention.

As an example of a work machine according to an embodiment of the present invention, a hydraulic excavator will be described below with reference to the drawings. In the respective drawings, equivalent members are given the same reference character, and overlapping description is omitted as appropriate.

FIG. 1 is a side view of a hydraulic excavator according to the present embodiment.

As illustrated in FIG. 1, a hydraulic excavator 200 includes a track structure 201, a swing structure 202 that is swingably disposed over the track structure 201 and that configures a machine body, and a work device 203 that is attached to the swing structure 202 pivotably in the vertical direction and that executes excavation work of earth and sand and so forth. The swing structure 202 is driven by a swing motor 211.

The work device 203 has a boom 204 attached to the swing structure 202 pivotably in the vertical direction, an arm 205 attached to the tip of the boom 204 pivotably in the vertical direction, a bucket 206 attached to the tip of the arm 205 pivotably in the vertical direction, a boom cylinder 204*a* that is an actuator for driving the boom 204, an arm cylinder 205*a* that is an actuator for driving the arm 205, and a bucket cylinder 206*a* that is an actuator for driving the bucket 206.

A cab 207 is disposed at a front-side position on the swing structure 202 and a counterweight 209 that ensures the weight balance is attached at a rear-side position. A machine chamber 208 is disposed between the cab 207 and the counterweight 209. An engine (not illustrated), hydraulic pumps 1 to 3 (illustrated in FIG. 2A), a control valve 210, and so forth are housed in the machine chamber 208. The control valve 210 controls the flow of a hydraulic operating fluid from the hydraulic pumps to the respective actuators.

Hydraulic drive systems to be described in the following embodiments are mounted in the hydraulic excavator 200 according to the present embodiment.

First Embodiment

Figure 2A:
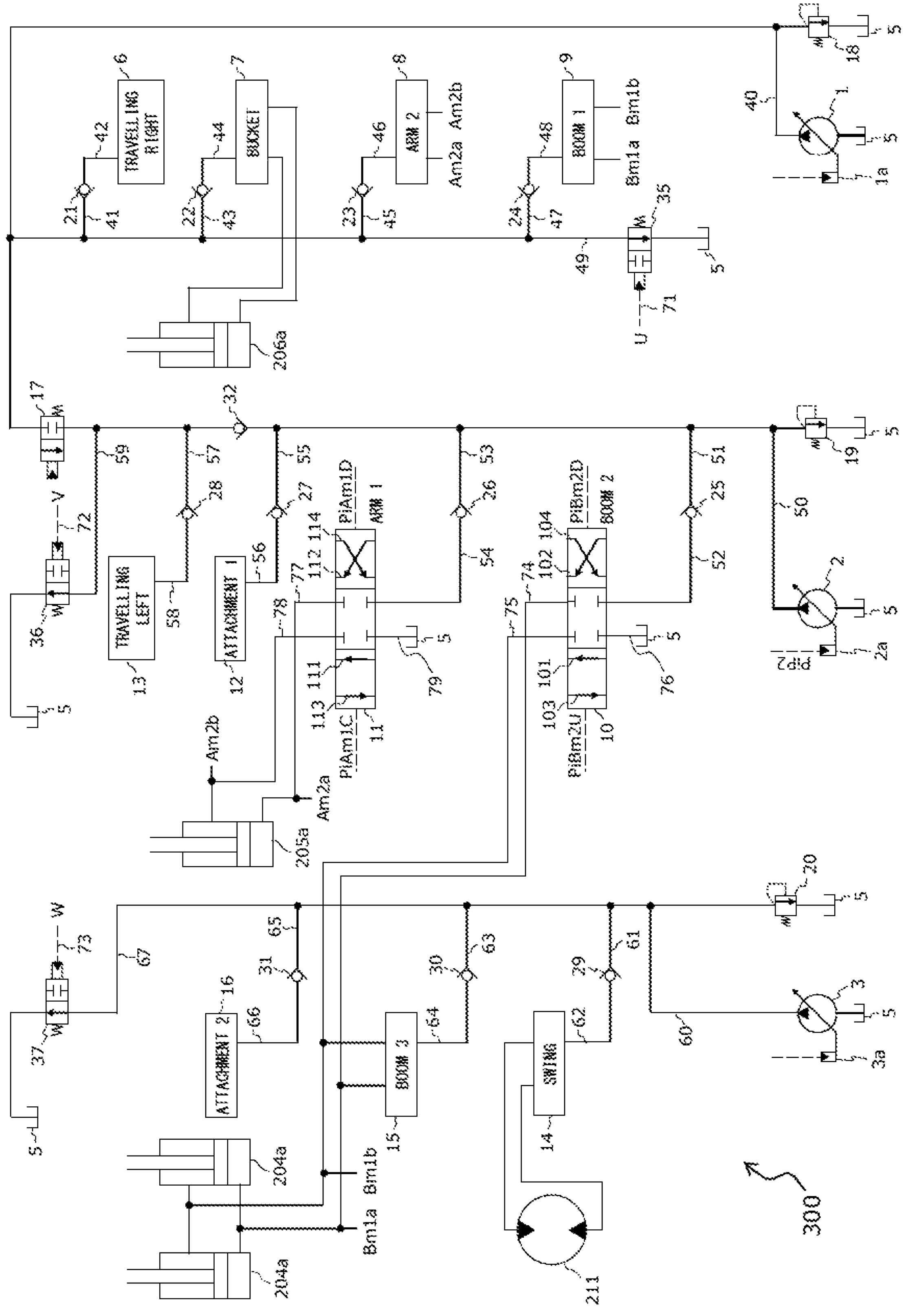
FIG. 2A is a circuit diagram (1/2) of a hydraulic drive system in a first embodiment of the present invention.
Figure 2B:
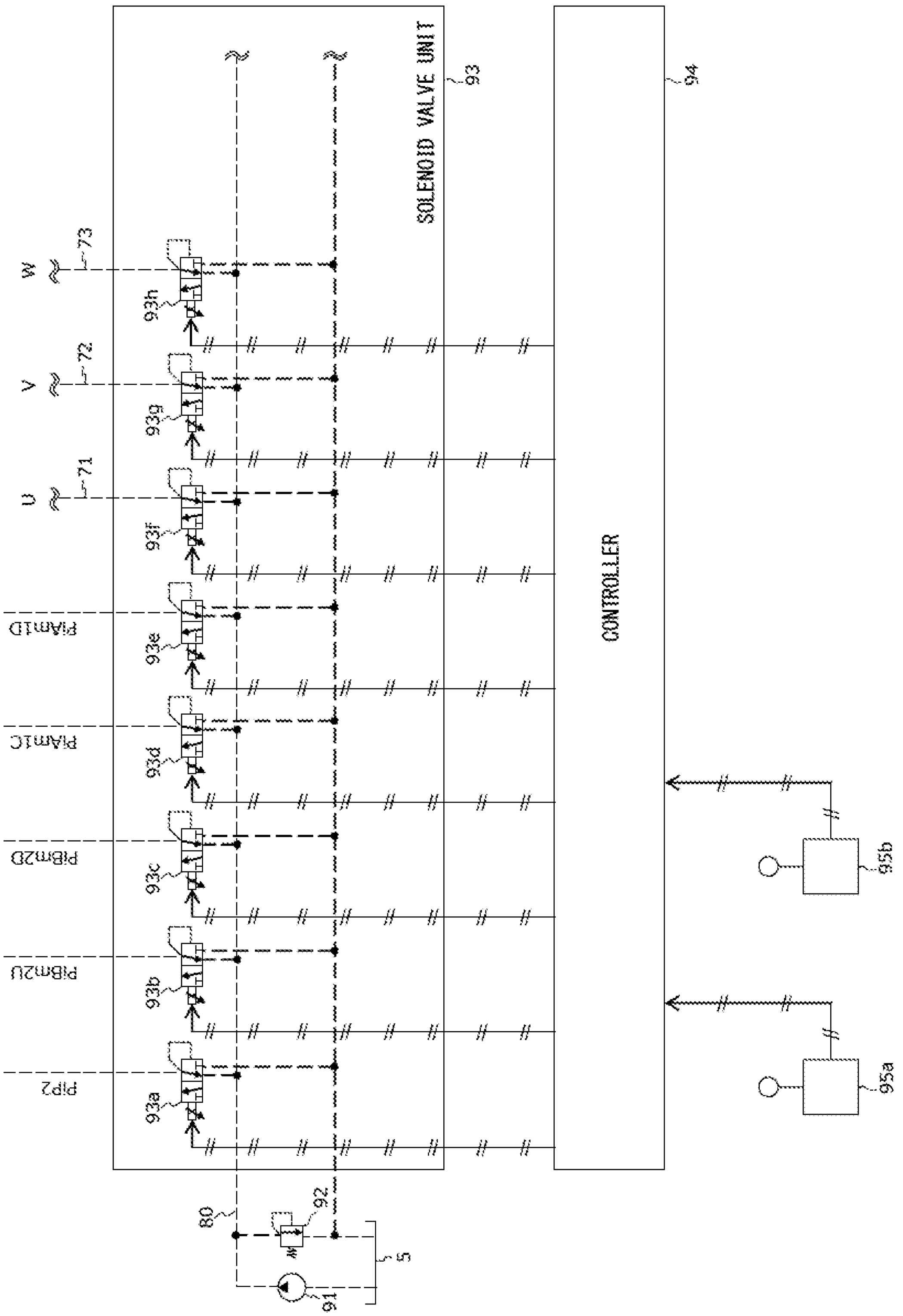
FIG. 2B is a circuit diagram (2/2) of the hydraulic drive system in the first embodiment of the present invention.

FIG. 2A and FIG. 2B are circuit diagrams of a hydraulic drive system in a first embodiment of the present invention.

(1) Configuration

A hydraulic drive system 300 in the first embodiment includes three main hydraulic pumps (a first hydraulic pump 1, a second hydraulic pump 2, and a third hydraulic pump 3 that are each a hydraulic pump of the variable displacement type, for example), a pilot pump 91, and a hydraulic operating fluid tank 5 that supplies oil to the hydraulic pumps 1 to 3 and the pilot pump 91. The hydraulic pumps 1 to 3 and the pilot pump 91 are driven by the engine (not illustrated).

A tilting angle of the first hydraulic pump 1 is controlled by a pump regulator annexed to the first hydraulic pump 1. The pump regulator of the first hydraulic pump 1 has a flow rate control command pressure port 1*a* and is driven by a pilot pressure that acts on the flow rate control command pressure port 1*a*. A tilting angle of the second hydraulic pump 2 is controlled by a pump regulator annexed to the second hydraulic pump 2. The pump regulator of the second hydraulic pump 2 has a flow rate control command pressure port 2*a* and is driven by a pilot pressure that acts on the flow rate control command pressure port 1*a*. A tilting angle of the third hydraulic pump 3 is controlled by a pump regulator annexed to the third hydraulic pump 3. The pump regulator of the third hydraulic pump 3 has a flow rate control command pressure port 3*a* and is driven by a pilot pressure that acts on the flow rate control command pressure port 3*a*.

To a pump line 40 of the first hydraulic pump 1, a directional control valve 6 for travelling right, a directional control valve 7 for the bucket, a second directional control valve 8 for the arm, and a first directional control valve 9 for the boom are connected in parallel through flow lines 41 and 42, flow lines 43 and 44, flow lines 45 and 46, and flow lines 47 and 48, respectively. Check valves 21 to 24 are respectively disposed on the flow lines 41 and 42, the flow lines 43 and 44, the flow lines 45 and 46, and the flow lines 47 and 48 in order to prevent reverse flow of the hydraulic fluid to the pump line 40. The directional control valve 6 for travelling right controls the flow of the hydraulic fluid supplied from the first hydraulic pump 1 to a travelling right motor which is not illustrated. The travelling right motor is one of a pair of travelling motors that drive the track structure 201. The directional control valve 7 for the bucket controls the flow of the hydraulic fluid supplied from the first hydraulic pump 1 to the bucket cylinder 206*a*. The second directional control valve 8 for the arm controls the flow of the hydraulic fluid supplied from the first hydraulic pump 1 to the arm cylinder 205*a*. The first directional control valve 9 for the boom controls the flow of the hydraulic fluid supplied from the first hydraulic pump 1 to the boom cylinder 204*a*. The pump line 40 is connected to the hydraulic operating fluid tank 5 through a main relief valve 18 in order to protect the circuit from an excessive pressure rise. The pump line 40 is connected to the hydraulic operating fluid tank 5 through a bleed-off valve 35 in order to discharge a surplus fluid delivered from the hydraulic pump 1.

To a pump line 50 of the second hydraulic pump 2, a second directional control valve 10 for the boom, a first directional control valve 11 for the arm, a directional control valve 12 for a first attachment, and a directional control valve 13 for travelling left are connected in parallel through flow lines 51 and 52, flow lines 53 and 54, flow lines 55 and 56, and flow lines 57 and 58, respectively. Check valves 25 to 28 are respectively disposed on the flow lines 51 and 52, the flow lines 53 and 54, the flow lines 55 and 56, and the flow lines 57 and 58 in order to prevent reverse flow of the hydraulic fluid to the pump line 50. The second directional control valve 10 for the boom controls the flow of the hydraulic fluid supplied from the second hydraulic pump 2 to the boom cylinder 204*a*. The first directional control valve 11 for the arm controls the flow of the hydraulic fluid supplied from the second hydraulic pump 2 to the arm cylinder 205*a*. The directional control valve 12 for the first attachment controls the flow of the hydraulic fluid supplied from the second hydraulic pump 2 to a first actuator which is not illustrated. The first actuator drives a first special attachment such as a cruncher disposed instead of the bucket 206, for example. The directional control valve 13 for travelling left controls the flow of the hydraulic fluid supplied from the second hydraulic pump 2 to a travelling left motor which is not illustrated. The travelling left motor is the other one of the pair of travelling motors that drive the track structure 201. The pump line 50 is connected to the hydraulic operating fluid tank 5 through a main relief valve 19 in order to protect the circuit from an excessive pressure rise. The pump line 50 is connected to the hydraulic operating fluid tank 5 through a bleed-off valve 36 in order to discharge a surplus fluid delivered from the hydraulic pump 2. The pump line 50 is connected to the pump line 40 through a flow-combining valve 17 in order to merge a fluid with the fluid delivered from the first hydraulic pump 1. A check valve 32 is disposed at a part of the pump line 50 connected to the flow line 55 and the flow line 57. The check valve 32 prevents the hydraulic fluid that is delivered from the first hydraulic pump 1 through the flow-combining valve 17 and that merges into the pump line 50 from flowing into the directional control valves 10 to 12 other than the directional control valve 13 for travelling left.

The second directional control valve 10 for the boom and the bottom side of the boom cylinder 204*a* are connected to each other through an actuator line 74. The second directional control valve 10 for the boom and the rod side of the boom cylinder 204*a* are connected to each other through an actuator line 75. The second directional control valve 10 for the boom and the hydraulic operating fluid tank 5 are connected to each other through a tank line 76. The first directional control valve 11 for the arm and the bottom side of the arm cylinder 205*a* are connected to each other through an actuator line 77. The first directional control valve 11 for the arm and the rod side of the arm cylinder 205*a* are connected to each other through an actuator line 78. The first directional control valve 11 for the arm and the hydraulic operating fluid tank 5 are connected to each other through a tank line 79. In a spool valve disc of the second directional control valve 10 for the boom, PA openings 101 and 102 (first flow lines) that connect the pump line 50 to the actuator lines 74 and 75 and AT openings 103 and 104 (second flow lines) that connect the actuator lines 75 and 74 to the tank line 76 are formed. In a spool valve disc of the first directional control valve 11 for the arm, PA openings 111 and 112 (first flow lines) that connect the pump line 50 to the actuator lines 77 and 78 and AT openings 113 and 114 (second flow lines) that connect the actuator lines 77 and 78 to the tank line 79 are formed. The other directional control valves also have a similar configuration although illustration is omitted.

To a pump line 60 of the third hydraulic pump 3, a directional control valve 14 for swing, a third directional control valve 15 for the boom, and a directional control valve 16 for a second attachment are connected in parallel through flow lines 61 and 62, flow lines 63 and 64, and flow lines 65 and 66, respectively. Check valves 29 to 31 are respectively disposed on the flow lines 61 and 62, the flow lines 63 and 64, and the flow lines 65 and 66 in order to prevent reverse flow of the hydraulic fluid to the pump line 60. The directional control valve 14 for swing controls the flow of the hydraulic fluid supplied from the third hydraulic pump 3 to the swing motor 211. The third directional control valve 15 for the boom controls the flow of the hydraulic fluid supplied from the third hydraulic pump 3 to the boom cylinder 204*a*. The directional control valve 16 for the second attachment is used to control the flow of the hydraulic fluid supplied to a second actuator when a second special attachment including the second actuator is mounted in addition to the first special attachment or when the second special attachment including two actuators of the first actuator and the second actuator is mounted instead of the first special actuator. The pump line 60 is connected to the hydraulic operating fluid tank 5 through a main relief valve 20 in order to protect the circuit from an excessive pressure rise. The pump line 60 is connected to the hydraulic operating fluid tank 5 through a bleed-off valve 37 in order to discharge a surplus fluid delivered from the hydraulic pump 3.

A delivery port of the pilot pump 91 is connected to the hydraulic operating fluid tank 5 through a pilot relief valve 92 for pilot primary pressure generation and is also connected to one input ports of solenoid proportional valves 93*a* to 93*h* incorporated in a solenoid valve unit 93 through a flow line 80. The other input ports of the solenoid proportional valves 93*a* to 93*h* are connected to the hydraulic operating fluid tank 5. The solenoid proportional valves 93*a* to 93*h* each reduce a pilot primary pressure according to a command signal from a controller 94 to generate a pilot command pressure.

An output port of the solenoid proportional valve 93*a* is connected to the flow rate control command pressure port 2*a* of the regulator of the second hydraulic pump 2. Output ports of the solenoid proportional valves 93*b* and 93*c* are connected to pilot ports of the second directional control valve 10 for the boom. Output ports of the solenoid proportional valves 93*d* and 93*e* are connected to pilot ports of the first directional control valve 11 for the arm. An output port of the solenoid proportional valve 93*f* is connected to a pilot port of the bleed-off valve 35 through a flow line 71. An output port of the solenoid proportional valve 93*g* is connected to a pilot port of the bleed-off valve 36 through a flow line 72. An output port of the solenoid proportional valve 93*h* is connected to a pilot port of the bleed-off valve 37 through a flow line 73.

For simplification of explanation, illustrations of the following solenoid proportional valves are omitted: solenoid proportional valves for the flow rate control command pressure ports 1*a* and 3*a* of the regulators of the first hydraulic pump 1 and the third hydraulic pump 3; a solenoid proportional valve for the directional control valve 6 for travelling right; a solenoid proportional valve for the directional control valve 7 for the bucket; a solenoid proportional valve for the second directional control valve 8 for the arm; a solenoid proportional valve for the first directional control valve 9 for the boom; a solenoid proportional valve for the directional control valve 12 for the first attachment; a solenoid proportional valve for the directional control valve 13 for travelling left; a solenoid proportional valve for the directional control valve 14 for swing; a solenoid proportional valve for the third directional control valve 15 for the boom; and a solenoid proportional valve for the directional control valve 16 for the second attachment.

The hydraulic drive system 300 includes a boom operation lever 95*a* that allows switching operation of the first directional control valve 9 for the boom, the second directional control valve 10 for the boom, and the third directional control valve 15 for the boom and an arm operation lever 95*b* that allows switching operation of the first directional control valve 11 for the arm and the second directional control valve 8 for the arm. For simplification of explanation, illustrations of the following operation levers are omitted: an operation lever for travelling right that executes switching operation of the directional control valve 6 for travelling right; a bucket operation lever that executes switching operation of the directional control valve 7 for the bucket; a first attachment operation lever that executes switching operation of the directional control valve 12 for the first attachment; an operation lever for travelling left that executes switching operation of the directional control valve 13 for travelling left; a swing operation lever that executes switching operation of the directional control valve 14 for swing; and a second attachment operation lever that executes switching operation of the directional control valve 16 for the second attachment.

The hydraulic drive system 300 includes the controller 94, and the input amounts of the operation levers 95*a* and 95*b* are inputted to the controller 94. Further, the controller 94 outputs the command signal to the solenoid proportional valves 93*a* and 93*h* (including the solenoid proportional valves that are not illustrated) that the solenoid valve unit 93 has.

Figure 3:
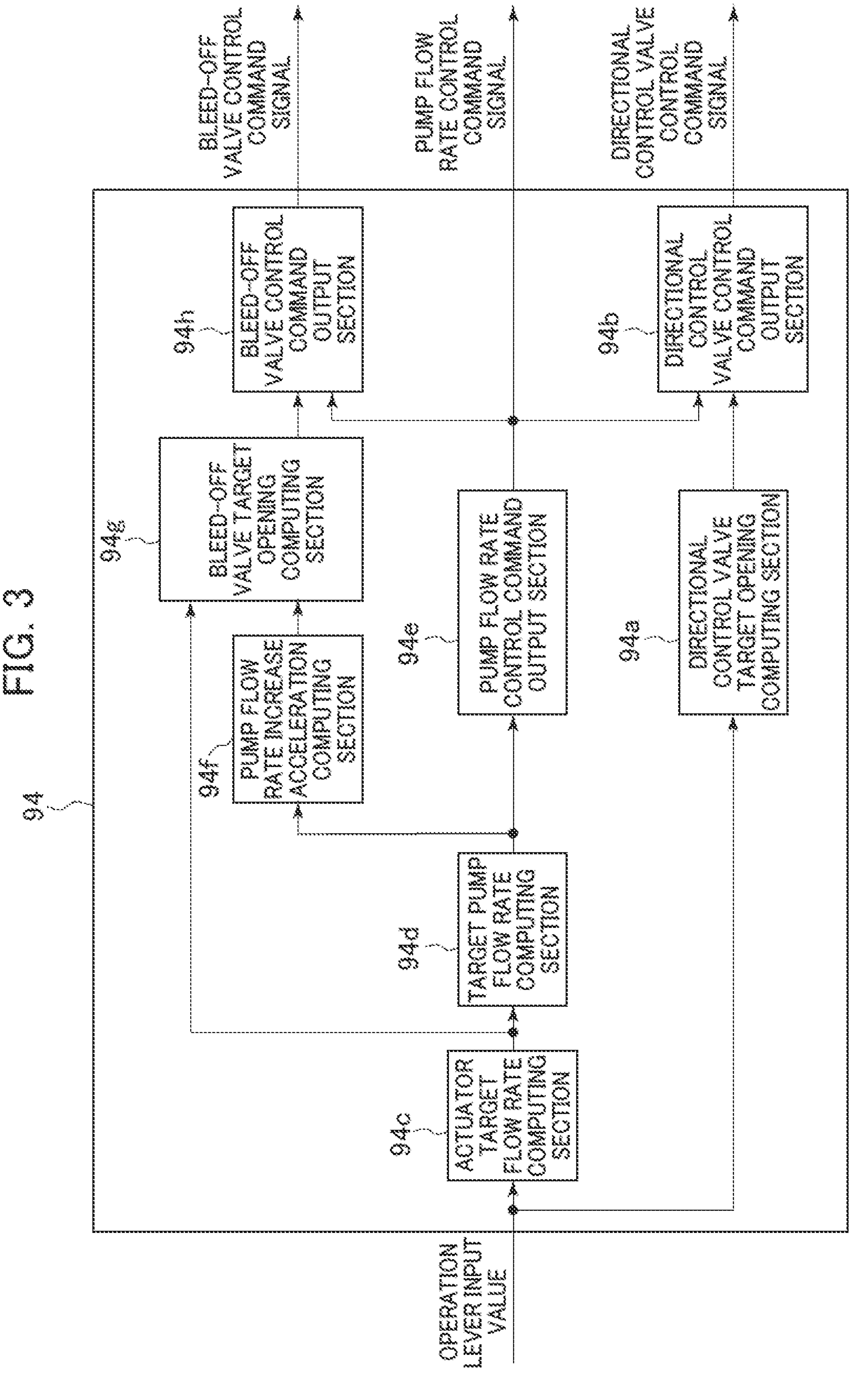
FIG. 3 is a functional block diagram of a controller in the first embodiment of the present invention.

FIG. 3 is a functional block diagram of the controller 94. In FIG. 3, the controller 94 has a directional control valve target opening computing section 94*a*, a directional control valve control command output section 94*b*, an actuator target flow rate computing section 94*c*, a target pump flow rate computing section 94*d*, a pump flow rate control command output section 94*e*, a pump flow rate increase acceleration computing section 94*f*, a bleed-off valve target opening computing section 94*g*, and a bleed-off valve control command output section 94*h*.

The directional control valve target opening computing section 94*a* computes a directional control valve target opening on the basis of an output lever input value. The actuator target flow rate computing section 94*c* computes actuator target flow rates on the basis of the operation lever input value. The target pump flow rate computing section 94*d* computes a target flow rate for the hydraulic pump (target pump flow rate) on the basis of the computation result (actuator target flow rates) from the actuator target flow rate computing section 94*c*.

The pump flow rate increase acceleration computing section 94*f* computes the increase acceleration of the pump flow rate (pump flow rate increase acceleration) on the basis of the computation result (target pump flow rate) from the target pump flow rate computing section 94*d* and the target pump flow rate computed at the previous time. The bleed-off valve target opening computing section 94*g* computes a target opening for the bleed-off valve (bleed-off valve target opening) on the basis of the computation result (actuator target flow rates) from the actuator target flow rate computing section 94*c*, the computation result (pump flow rate increase acceleration) from the pump flow rate increase acceleration computing section 94*f*, and an opening area characteristic set in advance with respect to the pump flow rate increase acceleration or an opening area characteristic set in advance with respect to the actuator target flow rate.

The pump flow rate control command output section 94*e* computes a control command of the solenoid proportional valve that generates a flow rate control command pressure of the pump, on the basis of the computation result (target pump flow rate) from the target pump flow rate computing section 94*d*, and outputs an electrical signal (command signal) corresponding to the control command. The directional control valve control command output section 94*b* computes a control command of the solenoid proportional valve that generates a control command pressure of the directional control valve, on the basis of the computation result (directional control valve target opening) from the directional control valve target opening computing section 94*a* and the computation result (pump flow rate control command) from the pump flow rate control command output section 94*e*, and outputs an electrical signal (command signal) corresponding to the control command. The bleed-off valve control command output section 94*h* computes a control command of the solenoid proportional valve that generates a command pressure of the bleed-off valve, on the basis of the computation result (bleed-off valve target opening) from the bleed-off valve target opening computing section 94*g* and the computation result (pump flow rate control command) from the pump flow rate control command output section 94*e*, and outputs an electrical signal (command signal) corresponding to the control command.

Figure 4:
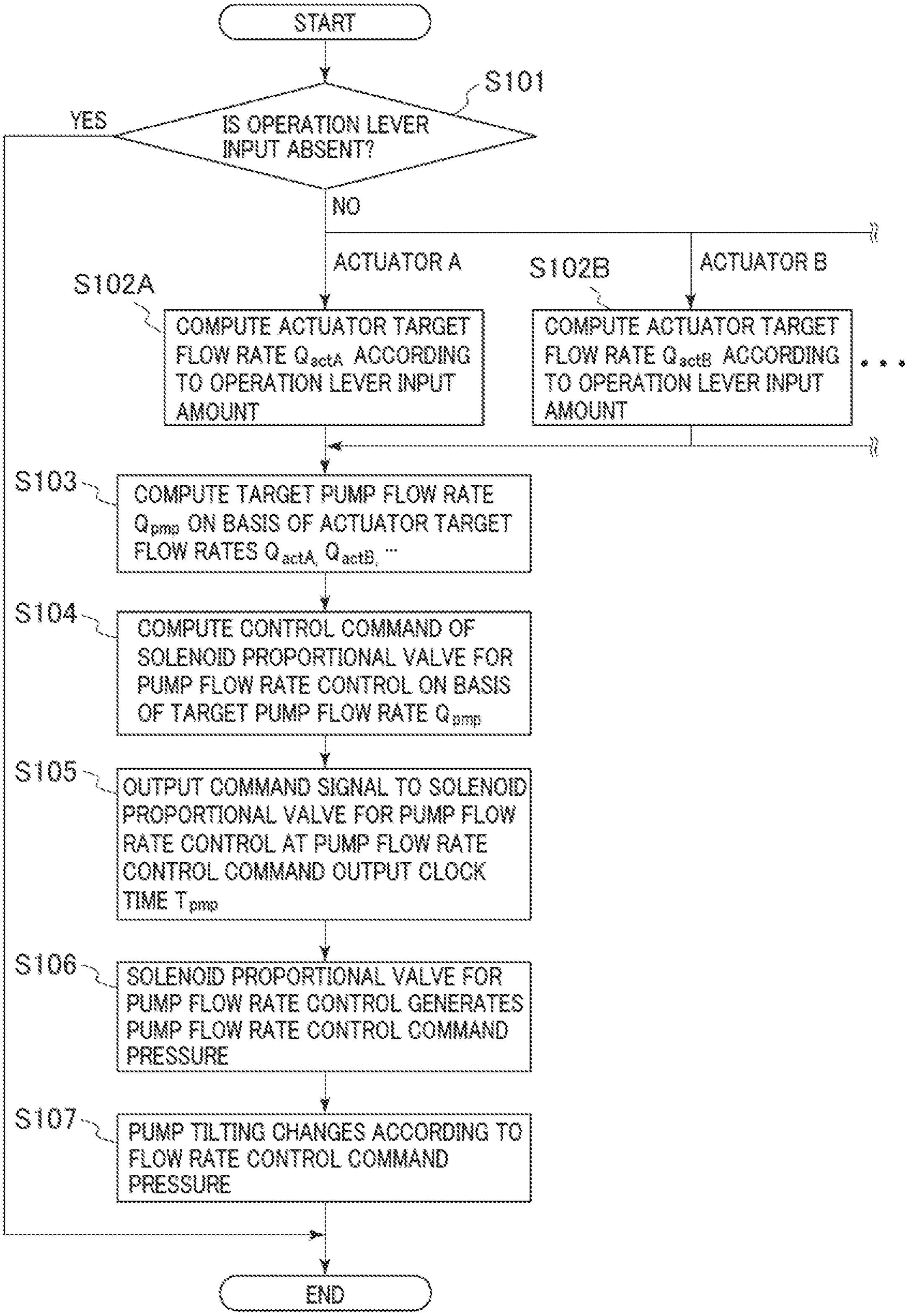
FIG. 4 is a flowchart illustrating processing relating to pump flow rate control by the controller in the first embodiment of the present invention.

FIG. 4 is a flowchart illustrating processing relating to pump flow rate control by the controller 94. In the following, only processing relating to flow rate control of the second hydraulic pump 2 will be described. Processing relating to flow rate control of the other hydraulic pumps is similar to this, and thus, description thereof is omitted.

First, the controller 94 determines whether or not input of the operation lever 95*a* or 95*b* is absent (step S101). When determining in the step S101 that input of the operation lever 95*a* or 95*b* is absent (YES), the controller 94 ends this flow.

When it is determined in the step S101 that input of the operation lever 95*a* or 95*b* is present (NO), the actuator target flow rate computing section 94*c* computes actuator target flow rates QactA, QactB, . . . (steps S102A, S102B, . . . ). Here, the actuator target flow rate QactA is a target value of the flow rate to be supplied from the hydraulic pump 2 to an actuator A (for example, boom cylinder 204*a*), and the actuator target flow rate QactB is a target value of the flow rate to be supplied from the hydraulic pump 2 to an actuator B (for example, arm cylinder 205*a*).

Subsequently to the steps S102A, S102B, . . . , the target pump flow rate computing section 94*d* computes the sum of the actuator target flow rates QactA, QactB, . . . as a target pump flow rate Qpmp (step S103). Here, the target pump flow rate Qpmp is set as appropriate and does not need to be made to exactly correspond with the sum of the actuator target flow rates QactA, QactB, . . . , and a bleed-off flow rate, a drain flow rate, or the like may be added.

Subsequently to the step S103, the pump flow rate control command output section 94*e* computes a control command of the solenoid proportional valve 93*a* for flow rate control of the hydraulic pump 2, on the basis of the target pump flow rate Qpmp (step S104), and outputs a command signal corresponding to the control command to the solenoid proportional valve 93*a* at a pump flow rate control command output clock time Tpmp (S105). Further, the pump flow rate control command output section 94*e* causes the solenoid proportional valve 93*a* to generate a flow rate control command pressure PiP2 of the hydraulic pump 2 (S106). Then, the tilting of the second hydraulic pump 2 is changed according to the flow rate control command pressure PiP2 (S107), and this flow is ended.

Figure 5:
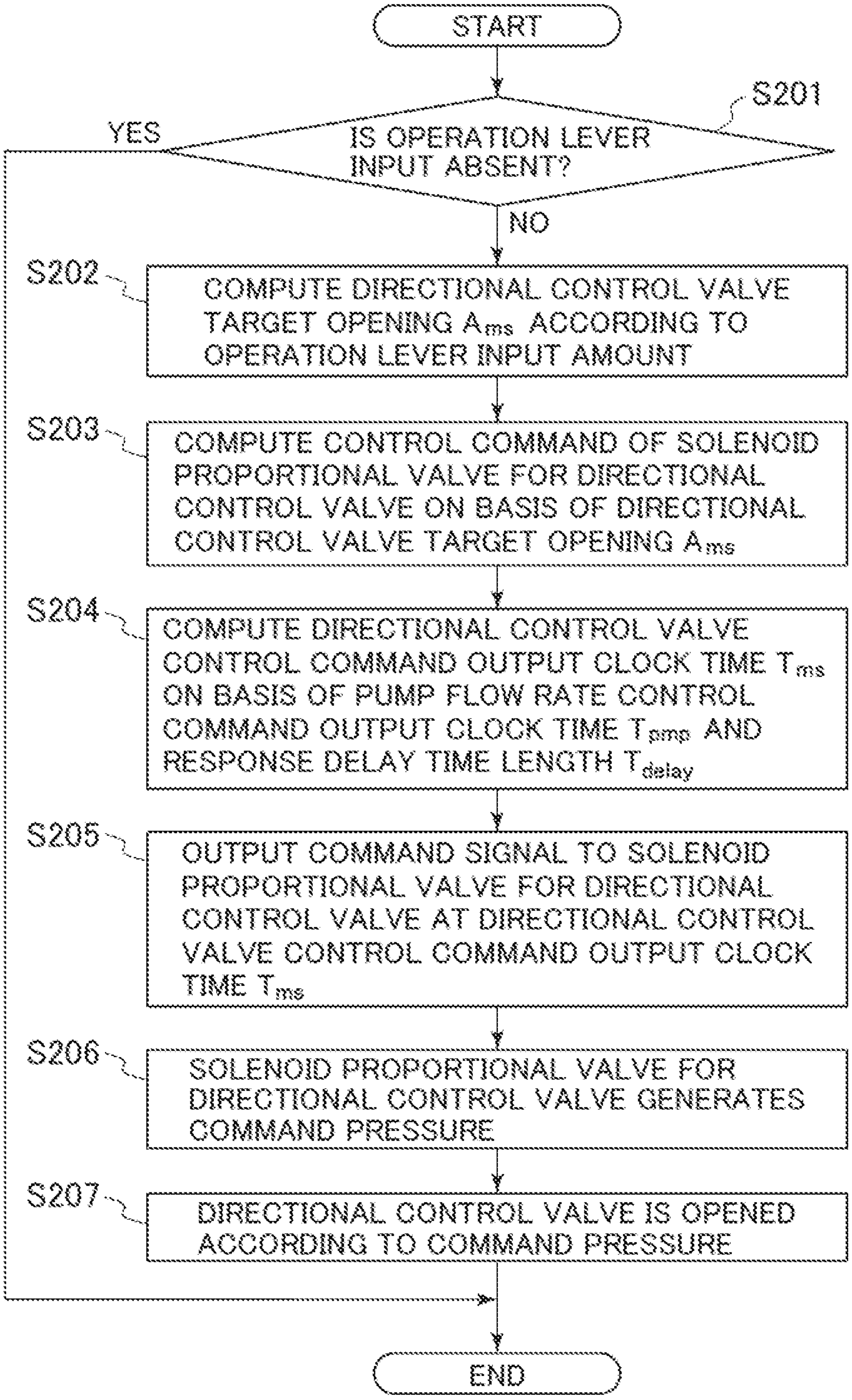
FIG. 5 is a flowchart illustrating processing relating to directional control valve opening control by the controller in the first embodiment of the present invention.

FIG. 5 is a flowchart illustrating processing relating to directional control valve opening control by the controller 94. In the following, only processing relating to the second directional control valve 10 for the boom will be described. Processing relating to the other directional control valves is similar to this, and thus, description thereof is omitted.

First, the controller 94 determines whether or not input of the boom operation lever 95*a* is absent (step S201). When determining in the step S201 that input of the boom operation lever 95*a* is absent (YES), the controller 94 ends this flow.

When it is determined in the step S201 that input of the boom operation lever 95*a* is present (NO), the directional control valve target opening computing section 94*a* of the controller 94 computes a target opening Ams for the directional control valve 10 according to the input amount of the boom operation lever 95*a* (step S202). The computation of the target opening for the directional control valve based on the operation lever input amount is executed according to a correspondence map between the operation lever input value and the target opening for the directional control valve, which is set in advance, for example.

Subsequently to the step S202, the directional control valve control command output section 94*b* computes a control command to be outputted to the solenoid proportional valve 93*d* or 93*e* for the directional control valve 10, on the basis of the target opening Ams for the directional control valve 10 (step S203).

Subsequently to the step S203, a directional control valve control command output clock time Tms is computed by using the following expression on the basis of the pump flow rate control command output clock time Tpmp and a delay time length Tdelay set in advance.

[Math. 1]

$$T_{ms}=T_{pmp}+T_{delay} \quad \text{Expression 1}$$

Here, it is desirable that the delay time length Tdelay be set on the basis of a response delay time length from output of the pump flow rate control command by the controller 94 to the start of control of the delivery flow rate by the hydraulic pump. This makes it possible to open the opening of the directional control valve 10 concurrently with the timing at which the flow rate of the hydraulic pump 2 changes.

Subsequently to the step S204, the directional control valve control command output section 94*b* outputs a command signal to the solenoid proportional valve 93*b* or 93*c* for the directional control valve 10 at the directional control valve control command output clock time Tms (S205), and causes the solenoid proportional valve 93*b* or 93*c* to generate a command pressure of the directional control valve 10 (S206). Then, the directional control valve 10 is opened according to the command pressure (S207), and this flow is ended.

Figure 6:
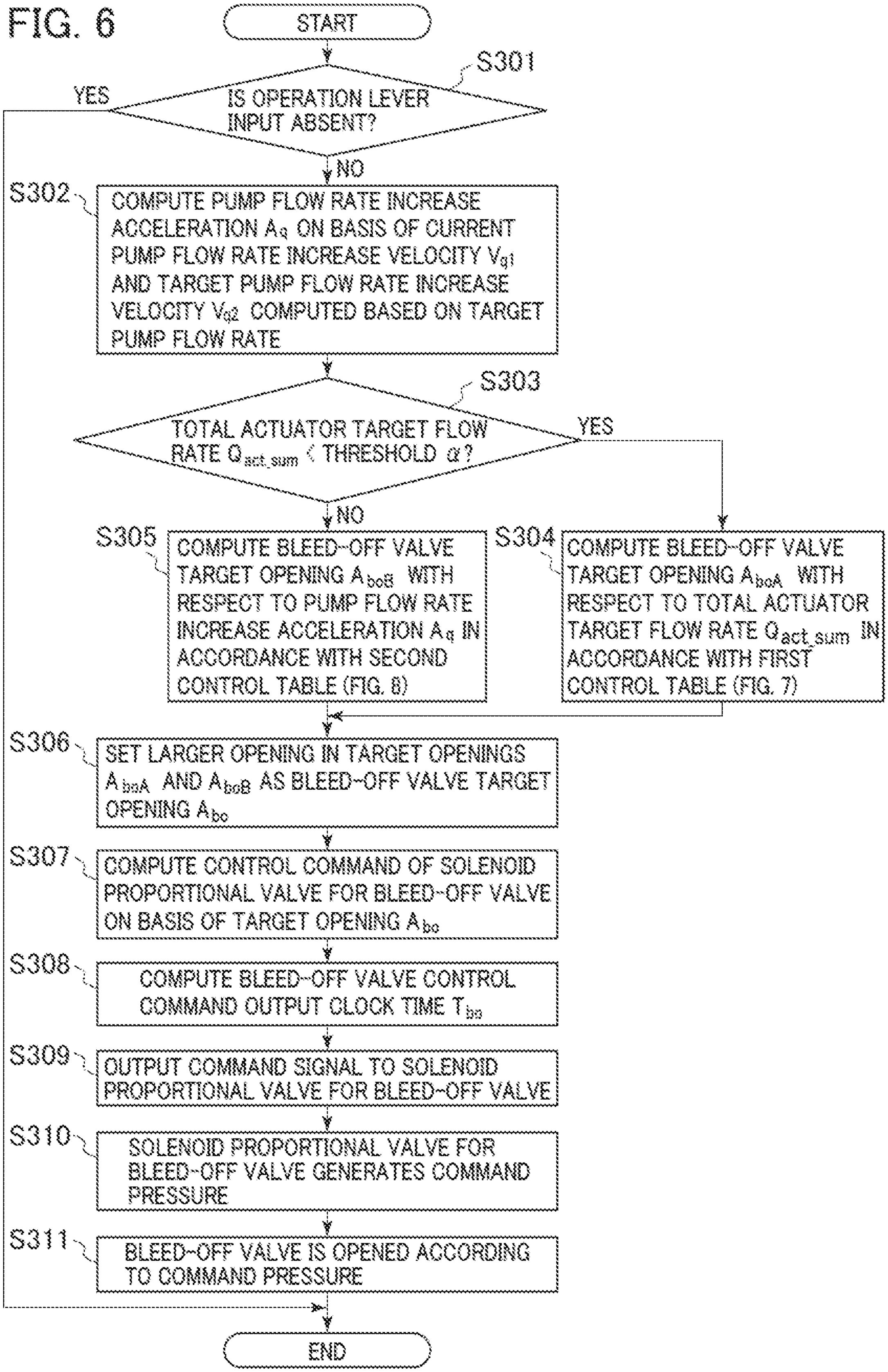
FIG. 6 is a flowchart illustrating processing relating to bleed-off valve opening control by the controller in the first embodiment of the present invention.

FIG. 6 is a flowchart illustrating processing relating to bleed-off valve opening control by the controller 94. In the following, only processing relating to control of the bleed-off valve 36 disposed on the pump line 50 of the second hydraulic pump 2 will be described. Processing relating to control of the other bleed-off valves is similar to this, and thus, description thereof is omitted.

First, the controller 94 determines whether or not input of the operation lever 95*a* or 95*b* is absent (step S301). When determining in the step S301 that input of the operation lever 95*a* or 95*b* is absent (YES), the controller 94 ends this flow.

When it is determined in the step S301 that input of the operation lever 95*a* or 95*b* is present (NO), the pump flow rate increase acceleration computing section 94*f* of the controller 94 computes a pump flow rate increase acceleration Aq by using the following expression on the basis of a current pump flow rate increase velocity Vq1 and a pump flow rate increase velocity Vq2 computed according to the computation result (target pump flow rate) from the target pump flow rate computing section 94*d* (step S302).

[Math. 2]

$$A_q=V_{q2}-V_{q1} \quad \text{Expression 2}$$

Subsequently to the step S302, it is determined whether or not a total actuator target flow rate Qact_sum computed on the basis of the target flow rates for the respective actuators computed by the actuator target flow rate computing section 94*c* is lower than a threshold α set in advance (step S303). Here, the threshold α is set to various values in order to obtain desired hydraulic system operation characteristics, and is set to, for example, the actuator target flow rate at the timing at which the bleed-off valve completely closes.

Figure 7:
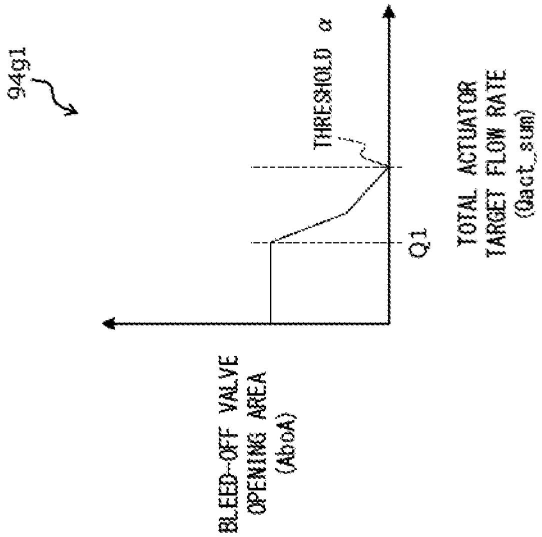
FIG. 7 is a diagram illustrating a first control table of a bleed-off valve in the first embodiment of the present invention.

When it is determined in the step S303 that Qact_sum is lower than the threshold α (YES), the bleed-off valve target opening computing section 94*g* of the controller 94 computes a target opening AboA for the bleed-off valve 36 with respect to the total actuator target flow rate Qact_sum according to a first control table 94$g$1 (illustrated in FIG. 7) (step S304). In FIG. 7, the first control table 94$g$1 is set in such a manner that the bleed-off valve opening area becomes the maximum when the total actuator target flow rate Qact_sum is equal to or lower than a predetermined value Q1, gradually becomes smaller when Qact_sum exceeds the predetermined value Q1, and becomes zero when Qact_sum exceeds the threshold α.

Figure 8:
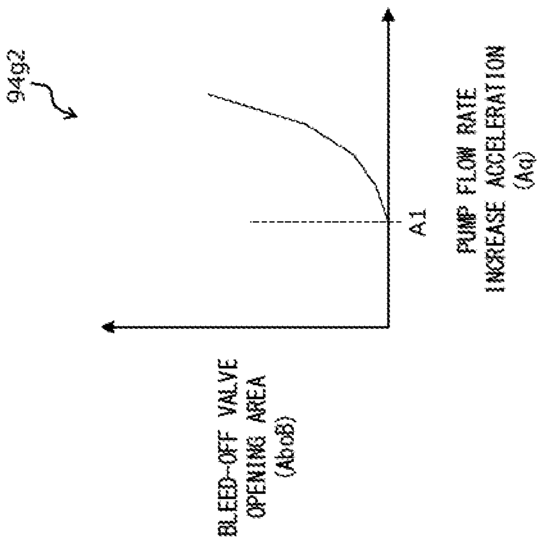
FIG. 8 is a diagram illustrating a second control table of the bleed-off valve in the first embodiment of the present invention.

Referring back to FIG. 6, when it is determined in the step S303 that Qact_sum is equal to or higher than the threshold α (NO), the bleed-off valve target opening computing section 94$g$ computes a bleed-off valve target opening AboB with respect to the pump flow rate increase acceleration Aq according to a second control table 94$g$2 (illustrated in FIG. 8) (step S305). In FIG. 8, the second control table 94$g$2 is set in such a manner that the bleed-off valve opening area becomes zero when the pump flow rate increase acceleration Aq is equal to or lower than a predetermined value A1, and gradually increases when the pump flow rate increase acceleration Aq exceeds the predetermined value A1. Here, the timing at which the pump flow rate increase acceleration Aq exceeds the predetermined value A1 is a timing at which the operation lever 95$a$ or 95$b$ is being operated and before the flow rate of a corresponding one of the hydraulic pumps 1 to 3 starts increasing, and the timing at which the pump flow rate increase acceleration Aq falls below the predetermined value A1 is a timing at which the operation lever 95$a$ or 95$b$ is being operated and after the flow rate of the corresponding one of the hydraulic pumps 1 to 3 has started increasing.

Referring back to FIG. 6, subsequently to the step S304 or the step S305, the bleed-off valve target opening computing section 94$g$ sets, as a target opening Abo for the bleed-off valve 36, one of the target openings AboA and AboB that has a larger opening than the other one (step S306).

Subsequently to the step S306, the bleed-off valve control command output section 94$h$ computes a control command corresponding to the solenoid proportional valve 93$g$ that generates a command pressure of the bleed-off valve 36 (step S307), and computes a bleed-off valve control command output clock time Tbo by using the following expression on the basis of the pump flow rate control command output clock time Tpmp obtained from the pump flow rate control command output section 94$e$ and a precedence time Tearly set in advance (step S308).

[Math. 3]

$$T_{bo}=T_{pmp}-T_{early} \qquad \text{Expression 3}$$

Here, it is desirable that the precedence time Tearly be set according to a response delay time length from output of a command signal to the solenoid proportional valve 93$g$ by the controller 94 to the start of opening of the bleed-off valve 36.

Subsequently to the step S308, the bleed-off valve control command output section 94$h$ outputs the command signal to the solenoid proportional valve 93$g$ that generates the command pressure of the bleed-off valve 36, at the bleed-off valve control command output clock time Tbo (step S309), and causes the solenoid proportional valve 93$g$ to generate the command pressure of the bleed-off valve 36 (step S310). Then, the bleed-off valve 36 is opened according to the command pressure (step S311), and this flow is ended.

(2) Operation

Figure 9:
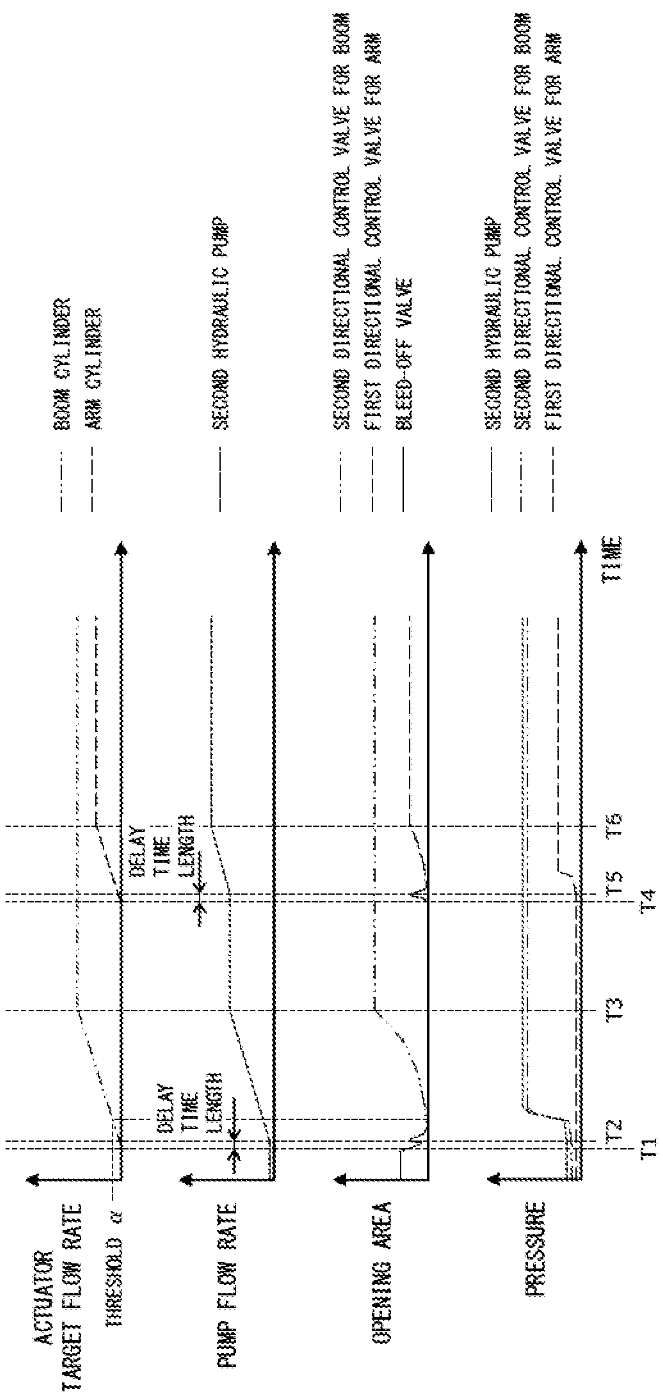
FIG. 9 is a diagram illustrating, in a time-series manner, the operation of the hydraulic drive system in the first embodiment of the present invention.

FIG. 9 is a diagram illustrating, in a time-series manner, the operation of the hydraulic drive system 300 when a combined operation of the boom 204 and the arm 205 is executed. FIG. 9 illustrates time-series change of the target flow rates (actuator target flow rates) for the boom cylinder 204$a$ and the arm cylinder 205$a$, the flow rate (pump flow rate) of the second hydraulic pump 2, the opening areas of the second directional control valve 10 for the boom, the first directional control valve 11 for the arm, and the bleed-off valve 36, and the pressures of the second hydraulic pump 2, the boom cylinder 204$a$, and the arm cylinder 205$a$. The operation at the respective clock times T1 to T6 in the diagram will be described below.

Clock Time T1;

An operator starts operating the boom operation lever 95$a$ in a boom raising direction. The target flow rate for the boom cylinder 204$a$ increases according to the input amount of the operation lever 95$a$, and the controller 94 outputs a command signal to the solenoid proportional valves 93$a$ and 93$g$ that generate command pressures of the pump regulator 2$a$ of the second hydraulic pump 2 and the bleed-off valve 36. The bleed-off valve 36 starts closing in response to the command pressure generated by the solenoid proportional valve 93$g$.

Clock Time T2;

The controller 94 outputs a control command to the solenoid proportional valve 93$b$ that generates a command pressure of the second directional control valve 10 for the boom, at the timing at which the delay time length Tdelay has elapsed from the clock time Tpmp at which the command signal has been outputted to the solenoid proportional valve 93$a$. The second directional control valve 10 for the boom starts opening by the command pressure generated by the solenoid proportional valve 93$b$. At substantially the same timing as this, the flow rate of the second hydraulic pump 2 also starts increasing. At this time, because the bleed-off valve 36 is open, the bleed-off function is enabled, and the pressure of the second hydraulic pump 2 smoothly rises up without the occurrence of an excessive pressure variation.

Clock Time T3;

The input amount of the boom operation lever 95$a$ becomes constant, and the target flow rate for the boom cylinder 204$a$, the flow rate of the second hydraulic pump 2, and the opening area of the second directional control valve 10 for the boom become constant. The bleed-off valve 36 is fully closed at the timing at which the target flow rate for the boom cylinder 204$a$ reaches the threshold α. Further, the pressure of the boom cylinder 204$a$ also becomes constant as long as a load variation does not occur in the boom cylinder 204$a$.

Clock Time T4;

The operator starts operating the arm operation lever 95$b$ in an arm crowding direction. Because of an increase in the target flow rate for the arm cylinder 205$a$ according to the input amount of the operation lever 95$b$, the controller 94 outputs a command signal to the solenoid proportional valve 93$a$ that generates the command pressure of the pump regulator 2$a$ of the second hydraulic pump 2. Further, because of an increase in the flow rate increase acceleration Aq of the second hydraulic pump 2, the controller 94 also outputs a command signal to the solenoid proportional valve 93$g$ that generates the command pressure of the bleed-off valve 36. The bleed-off valve 36 starts opening by the command pressure generated by the solenoid proportional valve 93$g$. With this, the bleed-off valve 36 opens at a timing at which the arm operation lever 95$b$ is being operated and before the flow rate of the second hydraulic pump 2 starts increasing.

Clock Time T5;

The controller 94 outputs a command signal to the solenoid proportional valve 93*d* that generates a command pressure of the first directional control valve 11 for the arm, at the timing at which the delay time length Tdelay has elapsed from the clock time Tpmp at which the command signal has been outputted to the solenoid proportional valve 93*a* that generates the command pressure of the pump regulator 2*a* of the second hydraulic pump 2. The first directional control valve 11 for the arm starts opening by the command pressure generated by the solenoid proportional valve 93*d*. At substantially the same timing as this, the flow rate of the second hydraulic pump 2 also starts increasing. At this time, because the bleed-off valve 36 is open, the bleed-off function is enabled, and the pressure of the second hydraulic pump 2 smoothly rises up without the occurrence of an excessive pressure variation.

Clock Time T6;

The input amount of the arm operation lever 95*b* becomes constant, and the target flow rate for the arm cylinder 205*a*, the flow rate of the second hydraulic pump 2, and the opening area of the first directional control valve 11 for the arm become constant. The bleed-off valve 36 gradually closes in response to a decrease in the flow rate increase acceleration Aq of the second hydraulic pump 2 and is fully closed. With this, the bleed-off valve 36 closes at a timing at which the arm operation lever 95*b* is being operated and after the flow rate of the second hydraulic pump 2 has started increasing. Further, the pressure of the arm cylinder 205*a* also becomes constant as long as a load variation does not occur in the arm cylinder 205*a*.

(Effects)

In the present embodiment, the work machine 200 includes the machine body 202, the work device 203 attached to the machine body 202, the actuators 211, 204*a*, 205*a*, and 206*a* that drive the machine body 202 or the work device 203, the operation devices 95*a* and 96 for giving instructions on operations of the actuators 211, 204*a*, 205*a*, and 206*a*, the hydraulic pumps 1 to 3 of the variable displacement type, the pump regulators 1*a* to 3*a* that control capacities (tilting) of the hydraulic pumps 1 to 3, the hydraulic operating fluid tank 5 that supplies the hydraulic operating fluid to the hydraulic pumps 1 to 3, the directional control valves 6 to 16 that control the flow of the hydraulic fluid to be supplied from the hydraulic pumps 1 to 3 to the actuators 211, 204*a*, 205*a*, and 206*a*, the bleed-off valves 35 to 37 disposed on flow lines 49, 59, and 67 that connect the pump lines 40, 50, and 60 of the hydraulic pumps 1 to 3 to the hydraulic operating fluid tank 5, and the controller 94 that controls the pump regulators 1*a* to 3*a*, the directional control valves 6 to 16, and the bleed-off valves 35 to 37 according to the input amount of the operation device 95*a* or 95*b*. The controller 94 opens any of the bleed-off valves 35 to 37 at a timing at which the operation device 95*a* or 95*b* is being operated and before the flow rate of a corresponding one of the hydraulic pumps 1 to 3 starts increasing, and closes any of the bleed-off valves 35 to 37 at a timing at which the operation device 95*a* or 95*b* is being operated and after the flow rate of the corresponding one of the hydraulic pumps 1 to 3 has started increasing.

According to the first embodiment configured as above, any of the bleed-off valves 35 to 37 is opened at a timing at which the operation device 95*a* or 95*b* is being operated and before the flow rate of a corresponding one of the hydraulic pumps 1 to 3 starts increasing. Thus, abrupt actuation of the actuator 211, 204*a*, 205*a*, or 206*a* and a shock to the machine body 202 are prevented at the time of starting of the actuator 211, 204*a*, 205*a*, or 206*a*. This makes it possible to ensure high operability. Further, any of the bleed-off valves 35 to 37 is closed at a timing at which the operation device 95*a* or 95*b* is being operated and after the flow rate of the corresponding one of the hydraulic pumps 1 to 3 has started increasing. Thus, the bleed-off flow rate is reduced after starting of the actuator 211, 204*a*, 205*a*, or 206*a*. This makes it possible to improve the energy-saving performance.

Moreover, the work machine 200 in the present embodiment includes the solenoid proportional valve 93*a* for the pump regulator that generates the pilot pressures of the pump regulators 1*a*, 2*a*, and 3*a*, the solenoid proportional valves 93*b* to 93*e* for the directional control valve that generate the pilot pressures of the directional control valves 6 to 16, and the solenoid proportional valves 93*f* to 93*h* for the bleed-off valve that generate the pilot pressures of the bleed-off valves 35 to 37. The bleed-off valves 35 to 37 are connected to the pump lines 40, 50, and 60 in parallel to the directional control valves 6 to 16. The controller 94 computes the target pump flow rate Qpmp that is the target flow rate for each of the hydraulic pumps 1 to 3, on the basis of the input amount of the operation device 95*a* or 95*b*, and outputs a command signal corresponding to the target pump flow rate Qpmp to the solenoid proportional valve 93*a* for the pump regulator. The controller 94 computes the directional control valve target opening Ams that is the target opening for each of the directional control valves 6 to 16, on the basis of the input amount of the operation device 95*a* or 95*b*, and outputs a command signal corresponding to the directional control valve target opening Ams to the solenoid proportional valve 93*b* to 93*e* for the directional control valve. The controller 94 computes the pump flow rate increase acceleration Aq that is the increase acceleration of the flow rate of each of the hydraulic pumps 1 to 3, on the basis of the current pump flow rate increase velocity Vq1 of a corresponding one of the hydraulic pumps 1 to 3 and the pump flow rate increase velocity Vq2 of the corresponding one of the hydraulic pumps 1 to 3 computed according to the target pump flow rate Qpmp. The controller 94 computes the bleed-off valve target opening AboB that is the target opening for each of the bleed-off valves 35 to 37, on the basis of the pump flow rate increase acceleration Aq, and outputs a command signal corresponding to the bleed-off valve target opening AboB to the solenoid proportional valve 93*f* to 93*h* for the bleed-off valve. With this, in the hydraulic drive system 300 that controls the pump regulators 1*a* to 3*a*, the directional control valves 6 to 16, and the bleed-off valves 35 to 37 by the pilot pressures generated by the solenoid proportional valves 93*a* to 93*h*, high operability can be ensured by preventing abrupt actuation of the actuator 211, 204*a*, 205*a*, or 206*a* and a shock to the machine body 202 by use of the bleed-off function at the time of starting of the actuator 211, 204*a*, 205*a*, or 206*a*, and the energy-saving performance can be improved by reducing the bleed-off flow rate after starting of the actuator 211, 204*a*, 205*a*, or 206*a*.

Further, the controller 94 in the present embodiment outputs the command signal corresponding to the directional control valve target opening Ams to the solenoid proportional valve 93*b* to 93*e* for the directional control valve at a timing at which or before the controller 94 outputs the command signal corresponding to the target pump flow rate Qpmp to the solenoid proportional valve 93*a* for the pump regulator. With this, the directional control valves 6 to 16 open at the timing at which the pump flow rate increases.

This makes it possible to suppress a shock caused when the directional control valves 6 to 16 open before the pump flow rate starts increasing.

Moreover, the controller 94 in the present embodiment outputs a command signal corresponding to the bleed-off valve target opening Abo to the solenoid proportional valve 93*f*, 93*g*, or 93*h* for the bleed-off valve at a timing at which or before the controller 94 outputs the command signal corresponding to the target pump flow rate Qpmp to the solenoid proportional valve 93*a* for the pump regulator. With this, the bleed-off valves 35 to 37 open earlier than or simultaneously with the timing at which the pump flow rate increases. This makes it possible to suppress a shock caused by an increase in the pump flow rate, even when the directional control valves 6 to 16 open after the timing at which the pump flow rate increases.

Second Embodiment

Figure 10A:
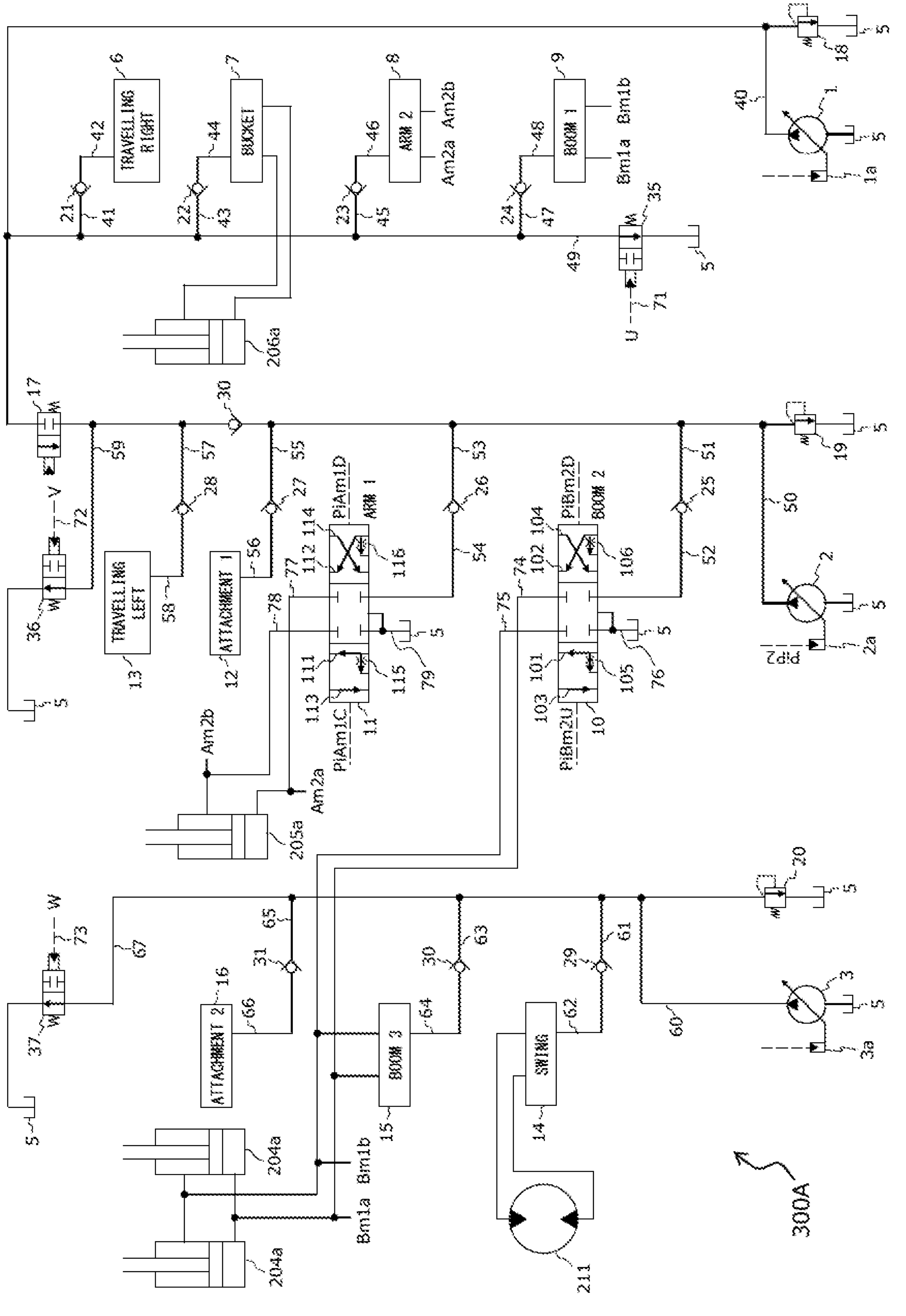
FIG. 10A is a circuit diagram (1/2) of a hydraulic drive system in a second embodiment of the present invention.
Figure 10B:
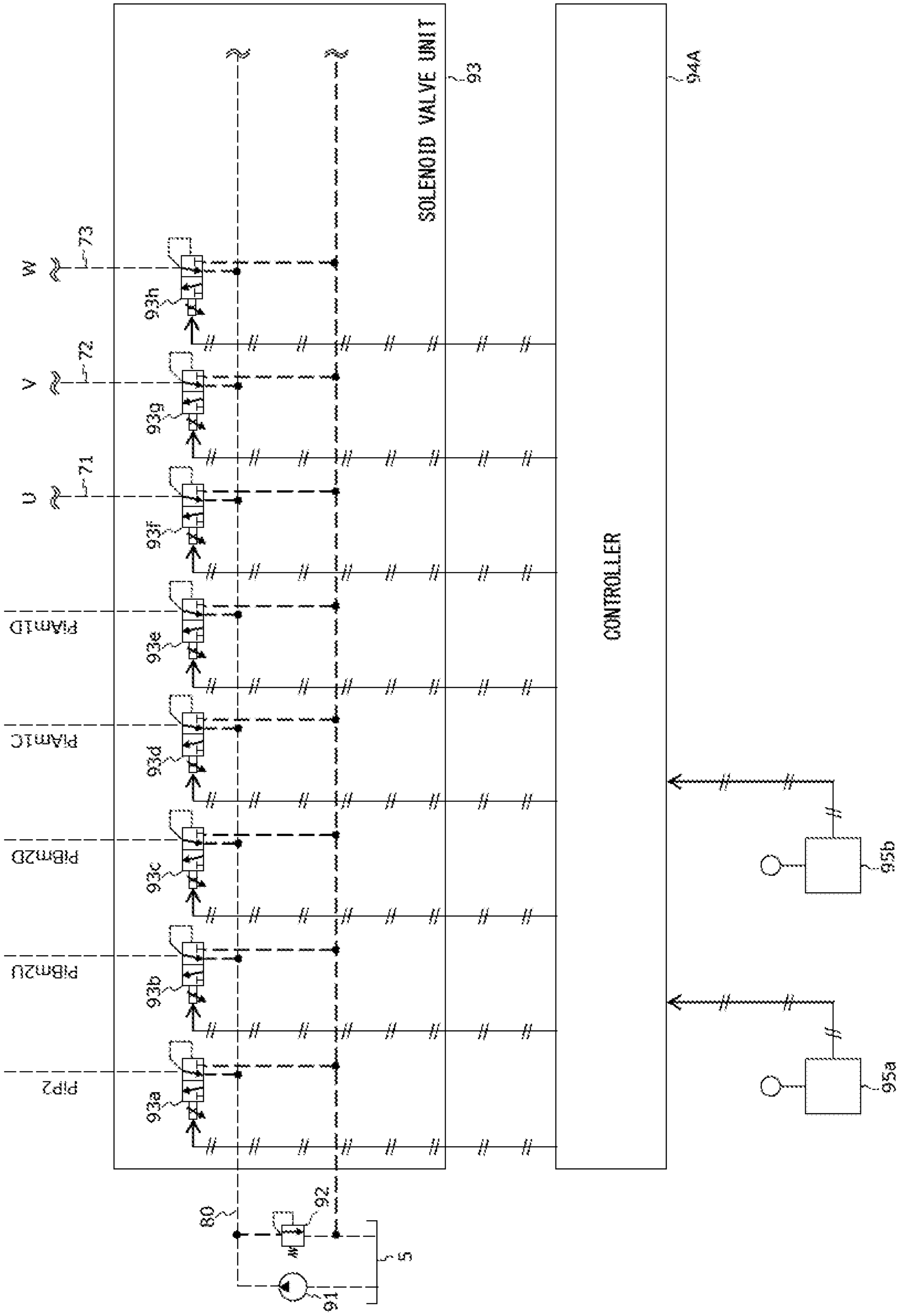
FIG. 10B is a circuit diagram (1/2) of the hydraulic drive system in the second embodiment of the present invention.

FIG. 10A and FIG. 10B are circuit diagrams of a hydraulic drive system in a second embodiment of the present invention.

(1) Configuration

The configuration of a hydraulic drive system 300A in the present embodiment is substantially the same as the hydraulic drive system 300 (illustrated in FIG. 2A and FIG. 2B) in the first embodiment but is different in the following points.

In the spool valve disc of the second directional control valve 10 for the boom, PT openings 105 and 106 (third flow lines) that connect the PA openings 101 and 102 (first flow lines) to the tank line 76 are formed. In the spool valve disc of the first directional control valve 11 for the arm, PT openings 115 and 116 (third flow lines) that connect the PA openings 111 and 112 (first flow lines) to the tank line 79 are formed. The other directional control valves also have a similar configuration although illustration is omitted.

Figure 11:
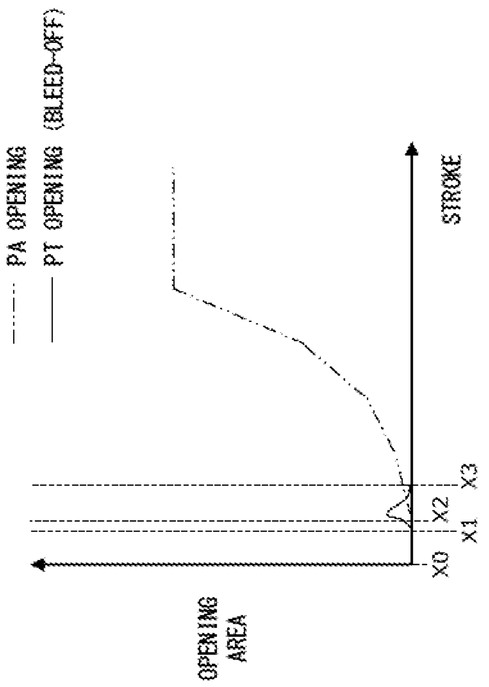
FIG. 11 is a diagram illustrating opening characteristics of a directional control valve in the second embodiment of the present invention.

In FIG. 11, opening characteristics of the PA opening (first flow line) and the PT opening (third flow line) of the directional control valves 6 to 16 are illustrated. The PT opening is fully closed when the spool is present at a neutral position (when the stroke is a predetermined value X0). The PT opening starts increasing when the stroke exceeds a predetermined value X1, and is fully closed again when the stroke reaches a predetermined value X3. The PA opening starts opening when the stroke exceeds a predetermined value X2. Here, the predetermined value X2 is set to a value between the predetermined value X1 and the predetermined value X3. With this, the PT opening starts opening earlier than the PA opening. Here, the timing at which the stroke exceeds the predetermined value X1 is a timing at which the operation lever 95*a* or 95*b* is being operated and before the flow rate of a corresponding one of the hydraulic pumps 1 to 3 starts increasing, and the timing at which the stroke reaches the predetermined value X3 is a timing at which the operation lever 95*a* or 95*b* is being operated and after the flow rate of the corresponding one of the hydraulic pumps 1 to 3 has started increasing.

Figure 12:
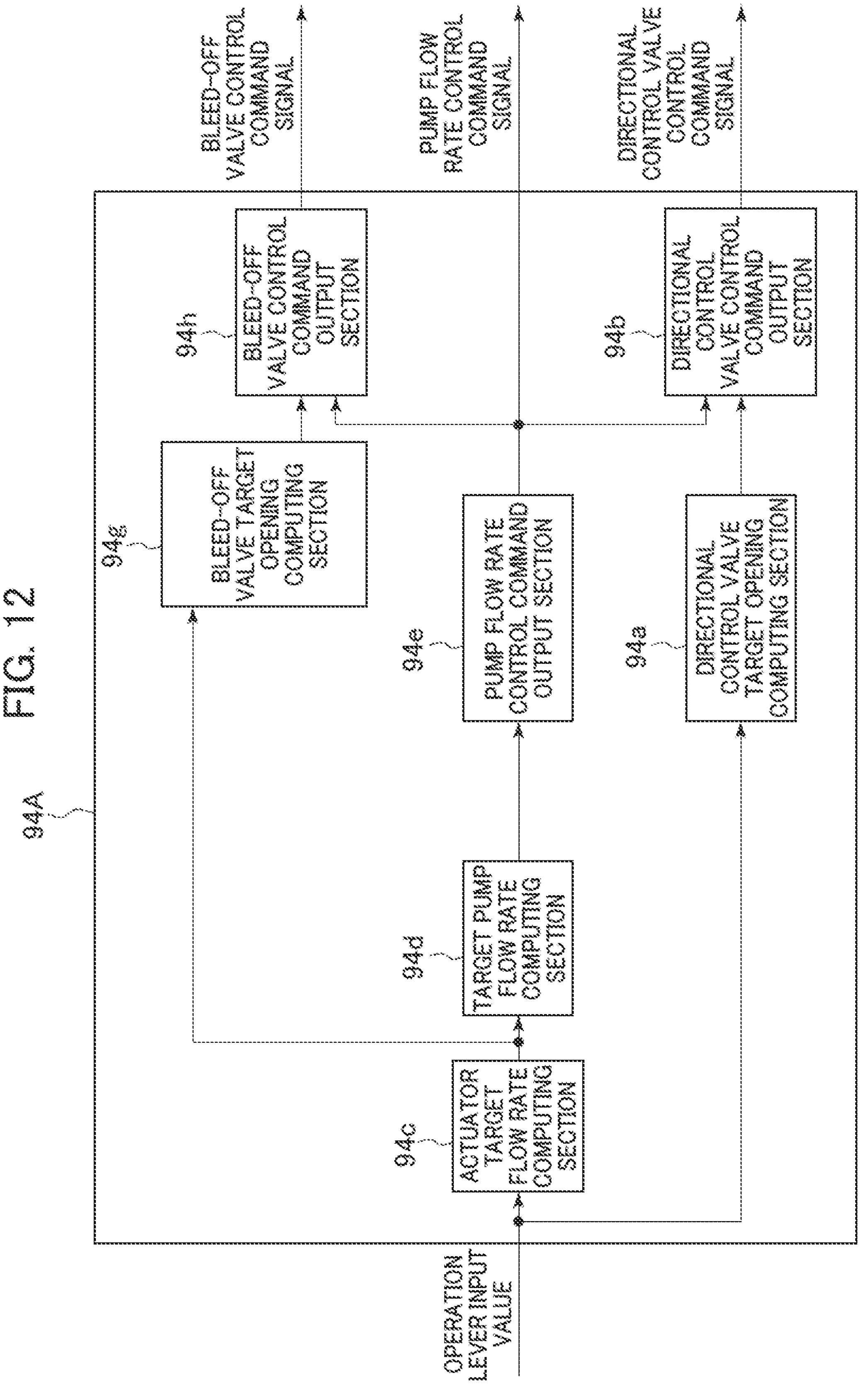
FIG. 12 is a functional block diagram of a controller in the second embodiment of the present invention.

FIG. 12 is a functional block diagram of a controller 94A in the present embodiment. The controller 94A does not include the pump flow rate increase acceleration computing section 94*f* (illustrated in FIG. 3) in the first embodiment. The bleed-off valve target opening computing section 94*g* computes the bleed-off valve target opening Abo on the basis of the computation result (actuator target flow rate) from the actuator target flow rate computing section 94*c* and an opening area characteristic set in advance with respect to the actuator target flow rate.

Figure 13:
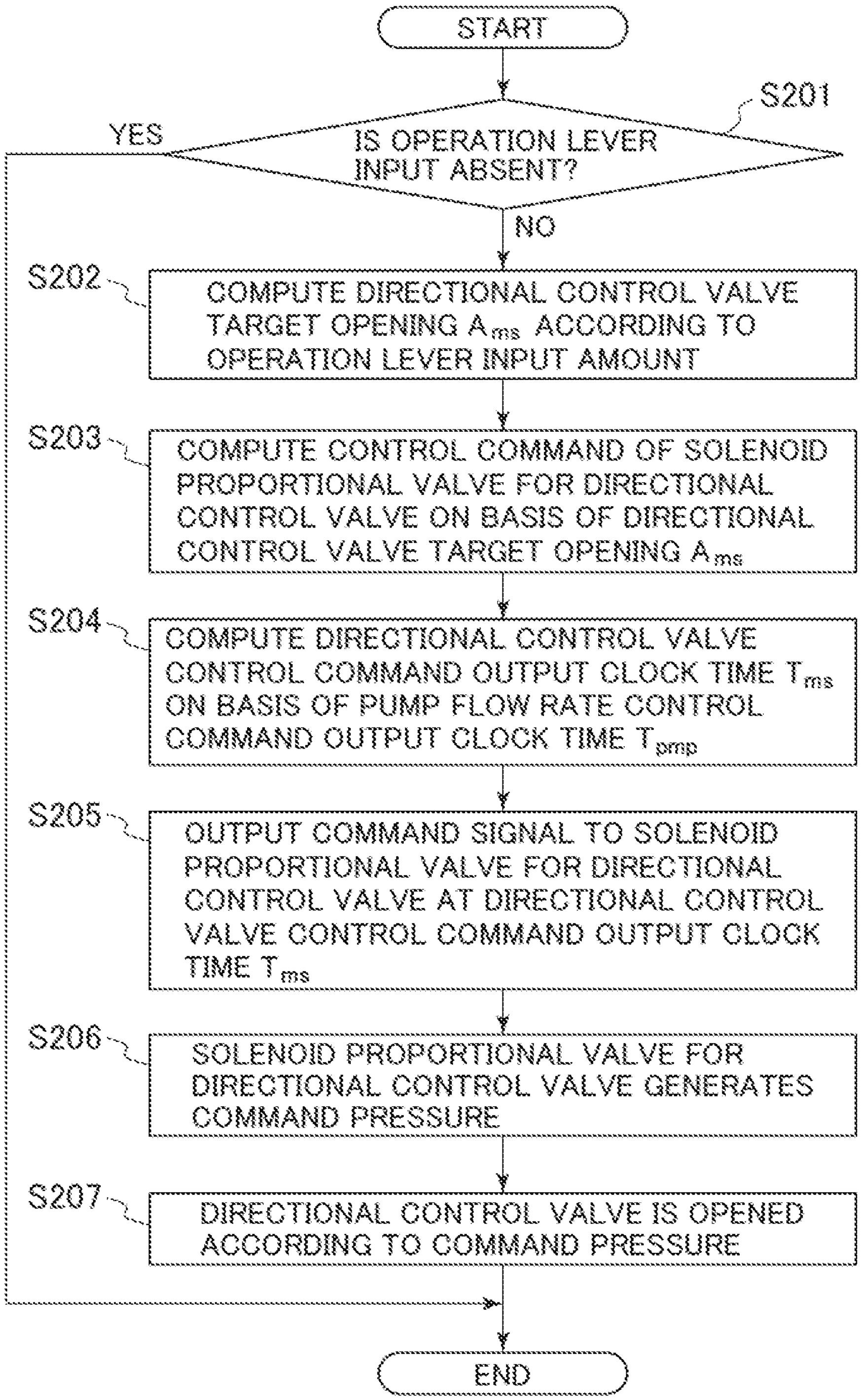
FIG. 13 is a flowchart illustrating processing relating to directional control valve opening control by the controller in the second embodiment of the present invention.

FIG. 13 is a flowchart illustrating processing relating to directional control valve opening control by the controller 94A in the present embodiment. In FIG. 13, the present embodiment is different from the first embodiment (illustrated in FIG. 5) in the method of computing the directional control valve control command output clock time Tms in the step S204. In the step S204 in the present embodiment, the directional control valve control command output clock time Tms is computed by using the following expression on the basis of the pump flow rate control command output clock time Tpmp obtained from the pump flow rate control command output section 94*e*.

[Math. 4]

$$T_{ms}=T_{pmp} \qquad \text{Expression 4}$$

With this, a command signal of the solenoid proportional valve for the directional control valve is output simultaneously with a command signal to the solenoid proportional valve for pump flow rate control.

Figure 14:
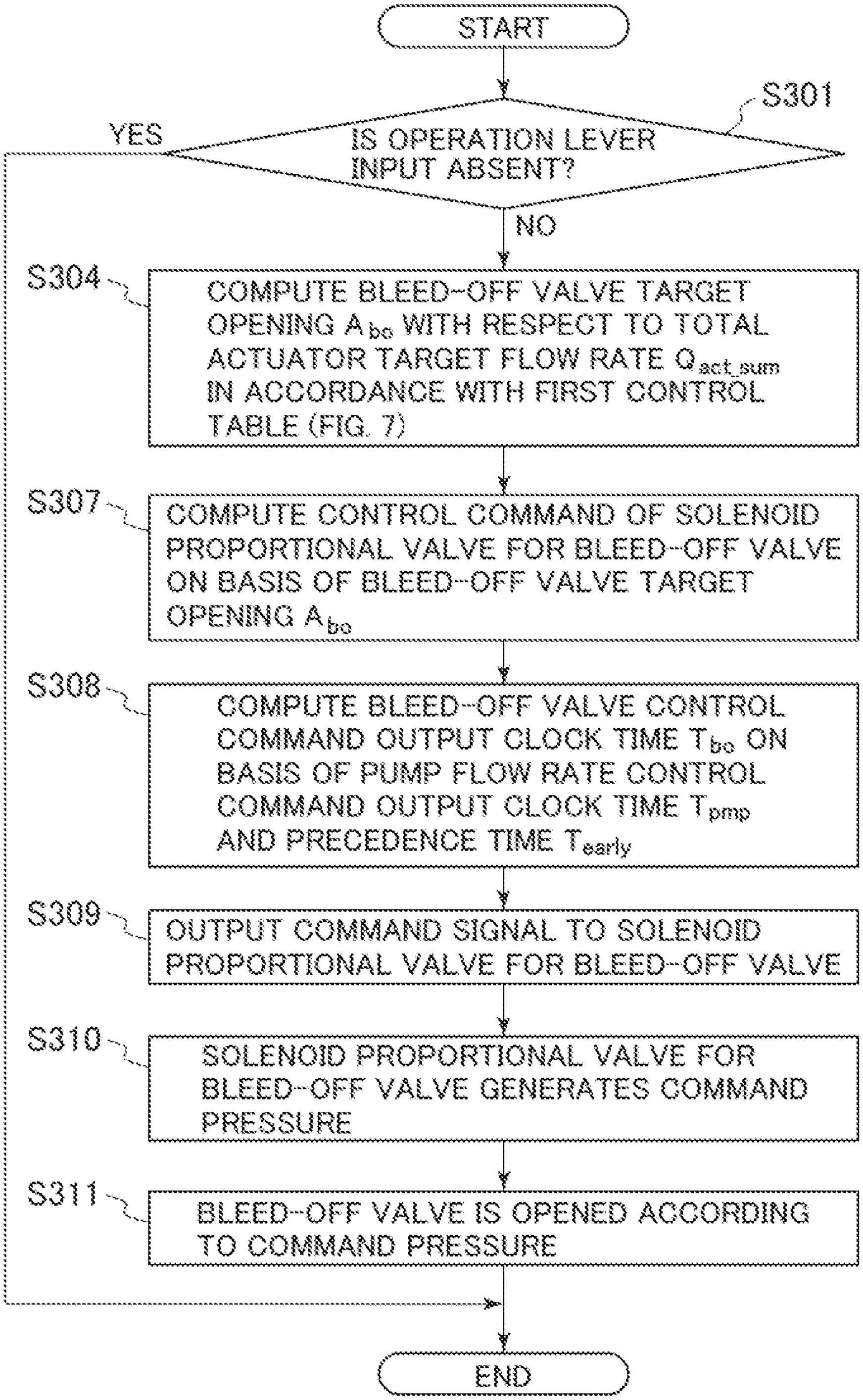
FIG. 14 is a flowchart illustrating processing relating to bleed-off valve opening control by the controller in the second embodiment of the present invention.

FIG. 14 is a flowchart illustrating processing relating to bleed-off valve opening control by the controller 94A. In FIG. 14, the present embodiment is different from the first embodiment (illustrated in FIG. 6) in that the steps S302, S303, and S305 are omitted and that a transition to the step S304 is made when it is determined in the step S301 that input of the operation lever 95*a* or 95*b* is present (NO). With this, the bleed-off valves 35 to 37 open according to only the total actuator target flow rate Qact_sum.

(2) Operation

Figure 15:
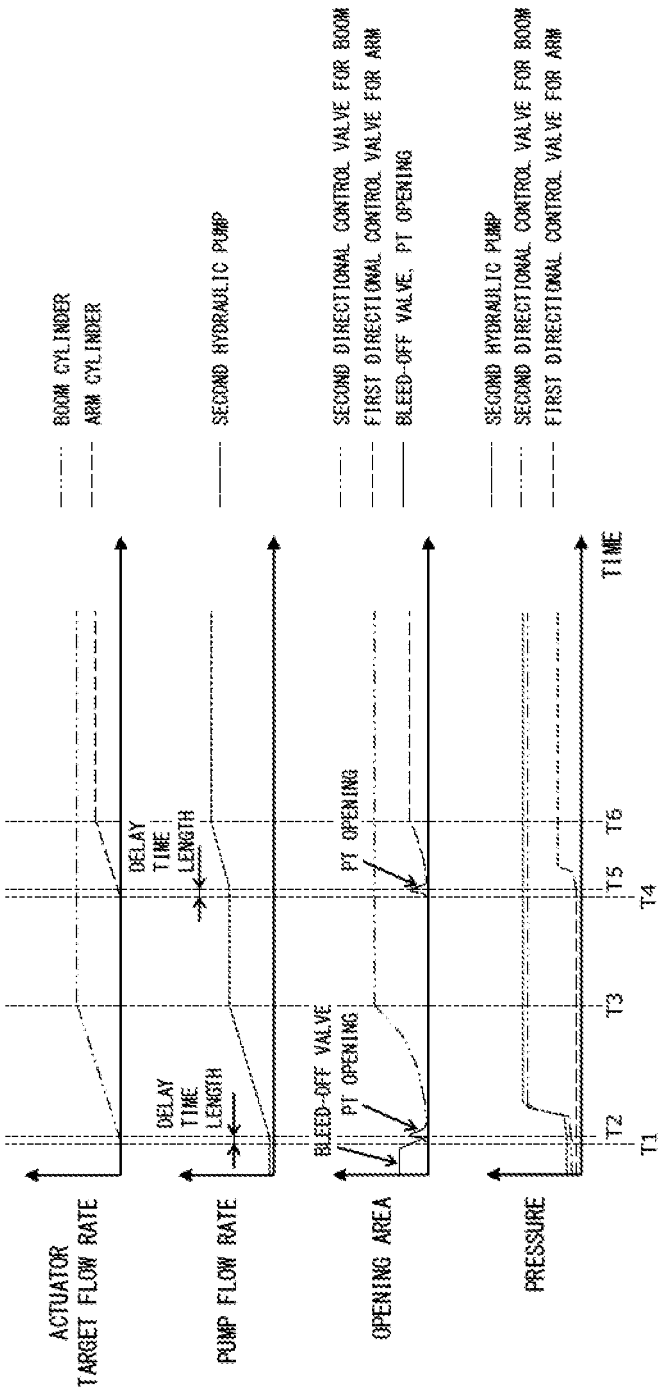
FIG. 15 is a diagram illustrating, in a time-series manner, the operation of the hydraulic drive system in the second embodiment of the present invention.

FIG. 15 is a diagram illustrating, in a time-series manner, the operation of the hydraulic drive system 300A when a combined operation of the boom 204 and the arm 205 is executed. FIG. 15 illustrates time-series change of the target flow rates (actuator target flow rates) for the boom cylinder 204*a* and the arm cylinder 205*a*, the flow rate (pump flow rate) of the second hydraulic pump, the opening areas of the second directional control valve 10 for the boom, the first directional control valve 11 for the arm, and the bleed-off valve 36, and the pressures of the second hydraulic pump 2, the boom cylinder 204*a*, and the arm cylinder 205*a*. The operation at the respective clock times T1 to T6 in the diagram will be described below.

Clock Time T1;

An operator starts operating the boom operation lever 95*a* in the boom raising direction. The target flow rate for the boom cylinder 204*a* increases according to the input amount of the operation lever 95*a*, and the controller 94 outputs a command signal to the solenoid proportional valves 93*a*, 93*b*, and 93*g* that generate command pressures of the pump regulator 2*a* of the second hydraulic pump 2, the second directional control valve 10 for the boom, and the bleed-off valve 36. The second directional control valve 10 for the boom makes a stroke by the command pressure generated by the solenoid proportional valve 93*b*, and the PT opening 105 starts opening. The bleed-off valve 36 starts closing in response to the command pressure generated by the solenoid proportional valve 93*g*.

Clock Time T2;

The flow rate of the second hydraulic pump 2 starts increasing. In addition, the PA opening 101 of the second directional control valve 10 for the boom also starts opening. At this time, because the bleed-off valve 36 is open, the bleed-off function is enabled, and the pressure of the second hydraulic pump 2 smoothly rises up without the occurrence of an excessive pressure variation.

Clock Time T3;

The input amount of the boom operation lever 95*a* becomes constant, and the target flow rate for the boom cylinder 204*a*, the flow rate of the second hydraulic pump 2, and the opening area of the second directional control valve 10 for the boom become constant. The PT opening 115 of the second directional control valve 10 for the boom is fully closed at the timing at which the target flow rate for the boom cylinder 204*a* reaches the threshold α. At this time, the PT opening 105 of the second directional control valve 10 for the boom is also closed. Further, the pressure of the boom cylinder 204*a* also becomes constant as long as a load variation does not occur in the boom cylinder 204*a*.

Clock Time T4;

The operator starts operating the arm operation lever 95*b* in the arm crowding direction. Because of an increase in the target flow rate for the arm cylinder 205*a* according to the input amount of the operation lever 95*b*, the controller 94A outputs a command signal to the solenoid proportional valve 93*d* that generates a command pressure of the first directional control valve 11 for the arm. The first directional control valve 11 for the arm makes a stroke in response to the command pressure generated by the solenoid proportional valve 93*d*, and the PT opening 115 starts opening. With this, the PT opening 115 of the first directional control valve 11 for the arm opens at a timing at which the arm operation lever 95*b* is being operated and before the flow rate of the second hydraulic pump 2 starts increasing.

Clock Time T5;

The flow rate of the second hydraulic pump 2 starts increasing according to the target flow rate for the arm cylinder 205*a*. In addition, the PA opening 111 of the first directional control valve 11 for the arm starts opening. At this time, because the PT opening 115 of the first directional control valve 11 for the arm is open, the bleed-off function is enabled, and the pressure of the arm cylinder 205*a* smoothly rises up without the occurrence of an excessive pressure variation.

Clock Time T6;

The input amount of the arm operation lever 95*b* becomes constant, and the target flow rate for the arm cylinder 205*a*, the flow rate of the second hydraulic pump, and the opening area of the first directional control valve 11 for the arm become constant. The bleed-off valve 36 is fully closed. The PT opening 115 of the first directional control valve 11 for the arm is fully closed at the timing at which the stroke of the spool valve disc exceeds the predetermined value X3. With this, the PT opening 115 closes at a timing at which the arm operation lever 95*b* is being operated and after the flow rate of the second hydraulic pump 2 has started increasing. Further, the pressure of the arm cylinder 205*a* also becomes constant as long as a load variation does not occur in the arm cylinder 205*a*.

(3) Effects

In the spool valve disc of the directional control valve 10 (11) in the present embodiment, the first flow lines 101 and 102 (111 and 112) that connect the pump line 50 of the hydraulic pump 2 to the actuator lines 74 and 75 (77 and 78), the second flow lines 103 and 104 (113 and 114) that connect the actuator lines 74 and 75 (77 and 78) to the tank line 76 (79), and the third flow lines 105 and 106 (115 and 116) that connect the first flow lines 101 and 102 (111 and 112) to the tank line 76 (79) are formed. The third flow lines 105 and 106 (115 and 116) are formed to open only in certain stroke zones X1 to X3 including the stroke X2 of the spool valve disc at the time when the first flow line 101 or 102 (111 or 112) starts opening. The function of the bleed-off valve 36 in the first embodiment is implemented by the third flow line 105 or 106 (115 or 116).

Also, in the present embodiment configured as above, effects similar to those of the first embodiment are obtained. Further, the function of the bleed-off valve 36 in the first embodiment is implemented by the spool valve discs of the directional control valves 10 and 11. Therefore, it becomes possible to simplify the control logic of the controller 94A and cause the bleed-off function to surely work at the time of operation of the directional control valve 10 or 11 without being affected by the response delay time length of the command signal or the command pressure.

Although the embodiments of the present invention have been described in detail above, the present invention is not limited to the above-described embodiments, and various modification examples are included therein. For example, the above-described embodiments are described in detail in order to explain the present invention in an easy-to-understand manner and are not necessarily limited to what includes all configurations described. Further, it is possible to add part of the configuration of a certain embodiment to the configuration of another embodiment, and it is also possible to delete part of the configuration of a certain embodiment or replace the part with part of another embodiment.

DESCRIPTION OF REFERENCE CHARACTERS

1: First hydraulic pump
1*a*: Flow rate control command pressure port (pump regulator)
2: Second hydraulic pump
2*a*: Flow rate control command pressure port (pump regulator)
3: Third hydraulic pump
3*a*: Flow rate control command pressure port (pump regulator)
5: Hydraulic operating fluid tank
6: Directional control valve for travelling right
7: Directional control valve for the bucket
8: Second directional control valve for the arm
9: First directional control valve for the boom
10: Second directional control valve for the boom
11: First directional control valve for the arm
12: Directional control valve for the first attachment
13: Directional control valve for travelling left
14: Directional control valve for swing
15: Third directional control valve for the boom
16: Directional control valve for the second attachment
17: Flow-combining valve
18, 19: Main relief valve
21 to 32: Check valve
35 to 37: Bleed-off valve
40: Pump line
41 to 49: Flow line
50: Pump line
51 to 59: Flow line
60: Pump line
61 to 67: Flow line
71 to 73: Flow line
74, 75: Actuator line
76: Tank line
77, 78: Actuator line
79: Tank line
80: Flow line
91: Pilot pump

92: Pilot relief valve
93: Solenoid valve unit
93*a* to 93*h*: Solenoid proportional valve
94: Controller
94*a*: Directional control valve target opening computing section
94*b*: Directional control valve control command output section
94*c*: Actuator target flow rate computing section
94*d*: Target pump flow rate computing section
94*e*: Pump flow rate control command output section
94*f*: Pump flow rate increase acceleration computing section
94*g*: Bleed-off valve target opening computing section
94*g*1: First control table
94*g*2: Second control table
94*h*: Bleed-off valve control command output section
95*a*: Boom operation lever (operation device)
95*b*: Arm operation lever (operation device)
101, 102: PA opening (first flow line)
103, 104: AT opening (second flow line)
105, 106: PT opening (third flow line)
111, 112: PA opening (first flow line)
113, 114: AT opening (second flow line)
115, 116: PT opening (third flow line)
200: Hydraulic excavator (work machine)
201: Track structure
202: Swing structure (machine body)
203: Work device
204: Boom
204*a*: Boom cylinder (actuator)
205: Arm
205*a*: Arm cylinder (actuator)
206: Bucket
206*a*: Bucket cylinder (actuator)
207: Cab
208: Machine chamber
209: Counterweight
210: Control valve
211: Swing motor (actuator)
300, 300A: Hydraulic drive system

The invention claimed is:

1. A work machine comprising:
a machine body;
a work device attached to the machine body;
an actuator that drives the machine body or the work device;
an operation device for giving an instruction on an operation of the actuator;
a hydraulic pump of a variable displacement type;
a pump regulator that controls a capacity of the hydraulic pump;
a hydraulic operating fluid tank that supplies a hydraulic operating fluid to the hydraulic pump;
a directional control valve that controls a flow of a hydraulic fluid to be supplied from the hydraulic pump to the actuator;
a bleed-off valve disposed on a flow line that connects a pump line of the hydraulic pump to the hydraulic operating fluid tank; and
a controller that controls the pump regulator, the directional control valve, and the bleed-off valve according to an input amount of the operation device, wherein
the controller is configured to
compute a target pump flow rate that is a target flow rate for the hydraulic pump, on a basis of the input amount of the operation device,
open the bleed-off valve at a timing at which the operation device is being operated and before the target pump flow rate starts increasing, and
close the bleed-off valve at a timing at which the operation device is being operated and after a flow rate of the hydraulic pump has started increasing.

2. The work machine according to claim 1, including:
a solenoid proportional valve for the pump regulator that generates a pilot pressure of the pump regulator;
a solenoid proportional valve for the directional control valve that generates a pilot pressure of the directional control valve; and
a solenoid proportional valve for the bleed-off valve that generate a pilot pressure of the bleed-off valve, wherein
the bleed-off valve is connected to the pump line in parallel to the directional control valve, and
the controller is configured to
output a command signal corresponding to the target pump flow rate to the solenoid proportional valve for the pump regulator,
compute a directional control valve target opening that is a target opening for the directional control valve, on a basis of the input amount of the operation device,
output a command signal corresponding to the directional control valve target opening to the solenoid proportional valve for the directional control valve,
compute a pump flow rate increase acceleration that is increase acceleration of the flow rate of the hydraulic pump, on a basis of a current pump flow rate increase velocity of the hydraulic pump and a pump flow rate increase velocity of the hydraulic pump computed according to the target pump flow rate,
compute a bleed-off valve target opening that is a target opening for the bleed-off valve, on a basis of the pump flow rate increase acceleration, and
output a command signal corresponding to the bleed-off valve target opening to the solenoid proportional valve for the bleed-off valve.

3. The work machine according to claim 2, wherein
the controller is configured to output the command signal corresponding to the directional control valve target opening to the solenoid proportional valve for the directional control valve at a timing at which a predetermined delay time length has elapsed since the controller outputs the command signal corresponding to the target pump flow rate to the solenoid proportional valve for the pump regulator.

4. The work machine according to claim 2, wherein
the controller is configured to output the command signal corresponding to the bleed-off valve target opening to the solenoid proportional valve for the bleed-off valve at a timing at which or before the controller outputs the command signal corresponding to the target pump flow rate to the solenoid proportional valve for the pump regulator.

5. The work machine according to claim 1, wherein
a first flow line that connects the pump line to the actuator, a second flow line that connects the actuator to the hydraulic operating fluid tank, and a third flow line that connects the first flow line to the hydraulic operating fluid tank are formed in a spool valve disc of the directional control valve,
the third flow line is formed to open only in a certain stroke zone including a stroke of the spool valve disc at a time where the first flow line starts opening, and
the bleed-off valve is formed by the third flow line.

* * * * *